United States Patent
Agrawal et al.

(10) Patent No.: US 11,281,715 B2
(45) Date of Patent: Mar. 22, 2022

(54) ASSOCIATING AN AUDIO TRACK WITH AN IMAGE

(71) Applicant: Motorola Mobility LLC, Chicago, IL (US)

(72) Inventors: Amit Kumar Agrawal, Bangalore (IN); Vishnu Kumar Shivaji Rao, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 125 days.

(21) Appl. No.: 16/818,503

(22) Filed: Mar. 13, 2020

(65) Prior Publication Data
US 2020/0218758 A1 Jul. 9, 2020

Related U.S. Application Data

(62) Division of application No. 15/925,695, filed on Mar. 19, 2018, now Pat. No. 10,872,115.

(51) Int. Cl.
G06F 16/58 (2019.01)
G06F 16/635 (2019.01)
G06F 16/68 (2019.01)

(52) U.S. Cl.
CPC ........ *G06F 16/5866* (2019.01); *G06F 16/635* (2019.01); *G06F 16/686* (2019.01)

(58) Field of Classification Search
CPC .. G06F 16/5866; G06F 16/635; G06F 16/686; G06F 16/433; G06F 16/683; G06F 16/58; G06F 16/639; G06F 16/40; G06F 16/51; G06F 16/9535; G06F 17/30268; G06F 17/30752; G06F 17/30761; H04N 5/772; H04N 5/765; H04N 5/907; H04N 2201/3264; H04N 2201/0084; H04N 21/8113; H04N 21/42203
See application file for complete search history.

(56) References Cited

U.S. PATENT DOCUMENTS

| | | | |
|---|---|---|---|
| 5,812,736 A | 9/1998 | Anderson | |
| 7,474,835 B2 | 1/2009 | Kimura | |
| 7,669,131 B2 | 2/2010 | Matsuyama | |
| 7,986,349 B2 | 7/2011 | Sasaki | |
| 8,259,192 B2 | 9/2012 | Nair | |
| 8,699,862 B1 * | 4/2014 | Sharifi | G11B 27/10 386/338 |
| 10,140,515 B1 * | 11/2018 | Waldo | G06K 9/6273 |

(Continued)

OTHER PUBLICATIONS

"Corrected Notice of Allowability", U.S. Appl. No. 15/925,695, dated Oct. 15, 2020, 3 pages.

(Continued)

*Primary Examiner* — Michael S Osinski
(74) *Attorney, Agent, or Firm* — FIG. 1 Patents

(57) ABSTRACT

Techniques described herein automatically associate an image with an audio track. At least some implementations identify an audio track of interest, and automate associating an image with the audio track. Some implementations gather context information during playback of an audio track, and use the context information to automatically identify an image to associate with the audio track. Upon associating the image with the audio track, various implementations render the image during subsequent playback of the audio track.

15 Claims, 14 Drawing Sheets

(56) References Cited

U.S. PATENT DOCUMENTS

| | | | |
|---|---|---|---|
| 10,423,659 B2 | 9/2019 | Barari et al. | |
| 10,732,799 B2* | 8/2020 | Kim | H04N 5/23216 |
| 10,872,115 B2 | 12/2020 | Agrawal et al. | |
| 11,055,346 B2* | 7/2021 | Modi | H04N 5/23218 |
| 2002/0021362 A1 | 2/2002 | Ejima et al. | |
| 2003/0049019 A1 | 3/2003 | Kimura | |
| 2004/0037540 A1 | 2/2004 | Frohlich et al. | |
| 2004/0109677 A1 | 6/2004 | Seo et al. | |
| 2007/0120986 A1 | 5/2007 | Nunomaki | |
| 2007/0257994 A1 | 11/2007 | Sakamoto et al. | |
| 2008/0077600 A1* | 3/2008 | Nakamura | G06Q 30/00 |
| 2009/0125136 A1 | 5/2009 | Akiyama | |
| 2010/0157097 A1 | 6/2010 | Lee et al. | |
| 2010/0172591 A1 | 7/2010 | Ishikawa | |
| 2010/0238304 A1 | 9/2010 | Miyata | |
| 2011/0063413 A1 | 3/2011 | Zhong et al. | |
| 2011/0069230 A1 | 3/2011 | Polumbus et al. | |
| 2011/0078729 A1 | 3/2011 | LaJoie et al. | |
| 2012/0098946 A1 | 4/2012 | Seung | |
| 2012/0155832 A1 | 6/2012 | Miyajima et al. | |
| 2012/0162347 A1 | 6/2012 | Furumachi et al. | |
| 2012/0169837 A1 | 7/2012 | Olofsson et al. | |
| 2012/0251082 A1* | 10/2012 | De Vos | H04N 9/8211 386/285 |
| 2012/0254708 A1 | 10/2012 | Cok et al. | |
| 2014/0063317 A1 | 3/2014 | Jung et al. | |
| 2014/0072223 A1 | 3/2014 | Aspa | |
| 2014/0161263 A1* | 6/2014 | Koishida | G06F 16/683 381/56 |
| 2014/0172429 A1* | 6/2014 | Butcher | G10L 25/54 704/270 |
| 2014/0192230 A1* | 7/2014 | Chang | H04N 1/32101 348/231.4 |
| 2014/0240546 A1 | 8/2014 | Okamoto | |
| 2014/0244576 A1 | 8/2014 | Masuda et al. | |
| 2014/0310269 A1* | 10/2014 | Zhang | G06F 16/68 707/725 |
| 2014/0313417 A1 | 10/2014 | Tateishi et al. | |
| 2014/0325408 A1 | 10/2014 | Leppanen et al. | |
| 2014/0362290 A1 | 12/2014 | Bridges et al. | |
| 2015/0128071 A1* | 5/2015 | Yang | H04L 12/1813 715/753 |
| 2015/0149908 A1* | 5/2015 | Lee | G11B 27/322 715/730 |
| 2015/0169747 A1 | 6/2015 | Hume et al. | |
| 2015/0324395 A1 | 11/2015 | Arnold et al. | |
| 2015/0373231 A1 | 12/2015 | Biswas et al. | |
| 2016/0005204 A1 | 1/2016 | Zeng et al. | |
| 2016/0073148 A1* | 3/2016 | Winograd | H04N 21/6582 725/18 |
| 2016/0100097 A1* | 4/2016 | Chaudhry | H04N 9/8205 348/333.02 |
| 2016/0100149 A1 | 4/2016 | Sharma et al. | |
| 2016/0132533 A1 | 5/2016 | Kim | |
| 2016/0133243 A1 | 5/2016 | Uehara | |
| 2016/0188667 A1 | 6/2016 | Maughan et al. | |
| 2016/0379274 A1* | 12/2016 | Irwin | G06Q 30/0271 705/14.67 |
| 2017/0068730 A1* | 3/2017 | Park | G10L 19/018 |
| 2017/0134688 A1* | 5/2017 | Yoon | H04N 1/32128 |
| 2017/0154220 A1 | 6/2017 | Chen et al. | |
| 2017/0235768 A1 | 8/2017 | Amrutkar et al. | |
| 2017/0300291 A1 | 10/2017 | Lee et al. | |
| 2018/0025215 A1 | 1/2018 | Yousef et al. | |
| 2018/0047374 A1* | 2/2018 | Numata | G06F 3/16 |
| 2018/0139565 A1* | 5/2018 | Norris | H04S 1/007 |
| 2018/0190253 A1* | 7/2018 | O'Driscoll | H04N 21/439 |
| 2018/0239820 A1 | 8/2018 | Jeong et al. | |
| 2018/0314959 A1 | 11/2018 | Apokatanidis et al. | |
| 2018/0349371 A1* | 12/2018 | Bessiere | G06F 16/44 |
| 2019/0286720 A1 | 9/2019 | Agrawal et al. | |
| 2020/0175065 A1* | 6/2020 | Zhu | H04N 21/4722 |
| 2020/0285439 A1* | 9/2020 | Chen | G06F 21/51 |
| 2020/0329211 A1* | 10/2020 | Jeong | H04N 5/92 |

OTHER PUBLICATIONS

"Corrected Notice of Allowance", U.S. Appl. No. 15/925,695, dated Sep. 23, 2020, 3 pages.

"Final Office Action", U.S. Appl. No. 15/925,695, dated Jul. 9, 2020, 15 pages.

"Notice of Allowance", U.S. Appl. No. 15/925,695, dated Aug. 17, 2020, 10 pages.

"Non-Final Office Action", U.S. Appl. No. 15/925,695, dated Apr. 9, 2020, 8 pages.

"Restriction Requirement", U.S. Appl. No. 15/925,695, dated Feb. 13, 2020, 6 pages.

* cited by examiner

ASSOCIATING AN AUDIO TRACK WITH AN IMAGE

RELATED APPLICATION

This application is a divisional of U.S. patent application Ser. No. 15/925,695, filed Mar. 19, 2018, the disclosure of which is hereby incorporated by reference herein in its entirety.

BACKGROUND

Various computing devices provide users with the ability to playback audio tracks. Unfortunately, the playback of an audio track oftentimes lacks personalization that helps the user remember or relive past experiences associated with that audio track.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
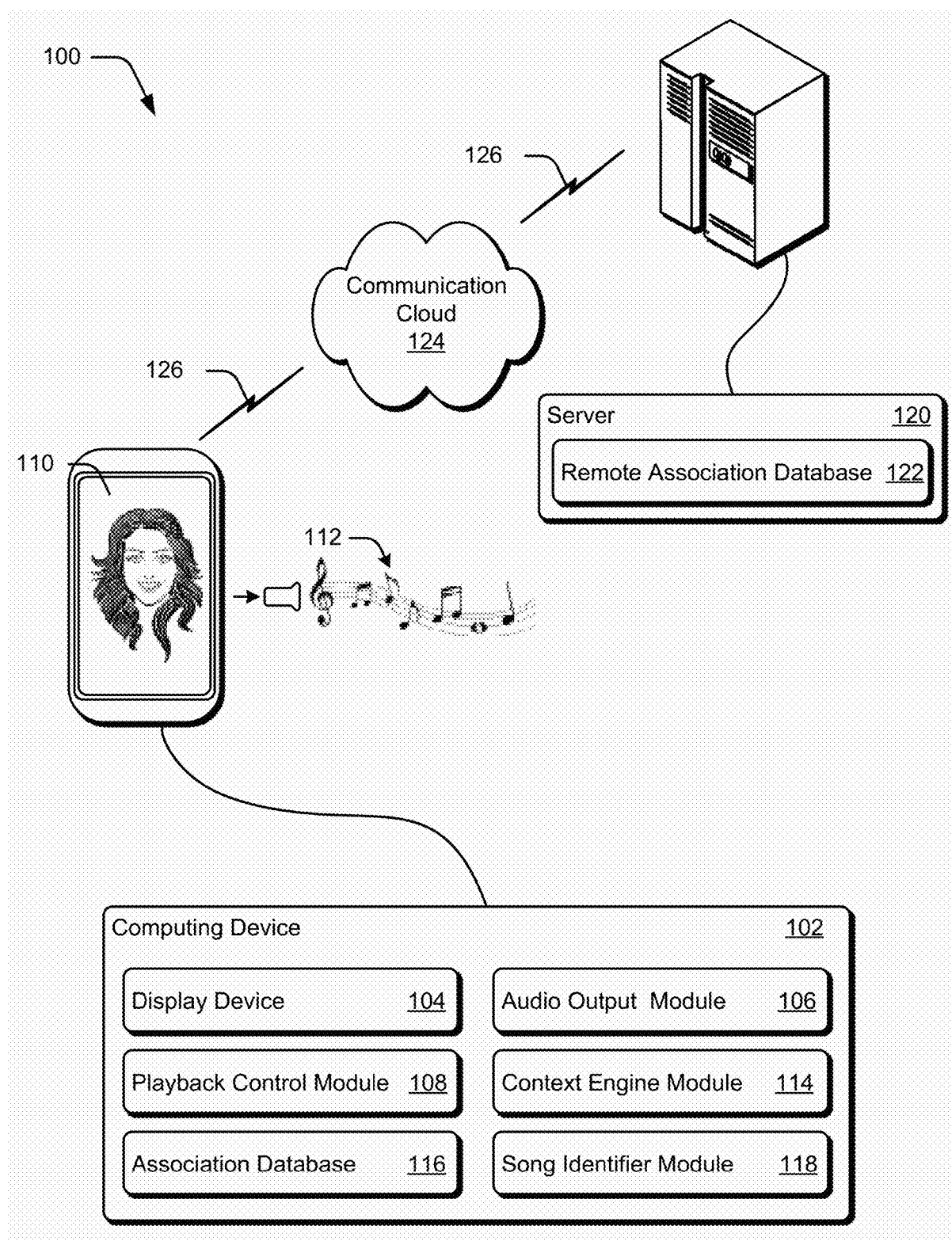
FIG. 1 is an overview of a representative environment that includes an example of personalized audio playback in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide automatic image association with an audio track. At least some implementations identify an audio track of interest, and automate associating an image with the audio track. Some implementations gather context information during playback of an audio track, and use the context information to automatically identify an image to associate with the audio track. Upon associating the image with the audio track, various implementations render the image during subsequent playback of the audio track.

Various implementations identify an audio track playing external to a computing device during capture of an image. Upon identifying the audio track, one or more implementations store audio track information with the image. During subsequent display of the image, some implementations display the audio track information with the image.

Consider now an example environment in which various aspects as described herein can be employed.

EXAMPLE ENVIRONMENT

FIG. 1 illustrates an example environment 100 in accordance with one or more implementations. Environment 100 includes computing device 102 in the form of a mobile communication device that is capable of displaying images and playing audio tracks. Accordingly, computing device 102 includes a display device 104 and an audio output module 106.

Display device 104 represents any suitable type of device that can be used to render images, such as an organic light-emitting diode (OLED) display, Liquid Crystal Display (LCD), a light-emitting diode display (LED), an electroluminescent display (ELD), a plasma display panel (PDP), and so forth. In some implementations, display device 104 include touch input capabilities, where input can be received through physical interactions with the display device (e.g., fingers, styluses, etc.). Various implementations use combinations of hardware, firmware and/or software to generate a device capable of rendering content. For example, computing device 102 can include a device driver that programmatically controls and/or drives hardware used to render content via display device 104.

Audio output module 106 represents any suitable type of device that can be used to project audible sounds, tones, and/or information. This can include speakers, audio ports, a sound card, and so forth. Various implementations of audio output module 106 use combinations of hardware, firmware and/or software to output the audible sound, such as a device driver that programmatically controls and/or drives hardware used to output audible information. In some implementations, computing device 102 includes a playback application, illustrated here as playback control module 108.

Playback control module 108 interfaces with audio output module 106 to output audible sound. Various implementations of playback control module 108 provide a user interface with various types of selectable software controls that allow the user to configure audio playback, such as selecting audio tracks, pausing playback, forwarding playback, creating playlists, volume control, and so forth. Alternately or additionally, playback control module 108 interfaces with hardware controls that manage audio playback, such as hardware control buttons corresponding to volume control, pause play, fast forward, etc. Various implementations of playback control module 108 includes display capabilities that render image(s) during playback of an audio track, such as rendering an image of a corresponding album cover, rendering a personal image, and so forth. In environment 100, computing device 102 displays image 110 during playback of audio track 112, where computing device 102 has automated the association process and/or obtained the association information that links image 110 and audio track 112 in accordance with one or more implementations.

Computing device 102 can use any suitable type of information to identify images that correspond to an audio track, such as context information that identifies an image captured during playback of audio track 112, context information corresponding to a location where playback of audio track 112 occurred, context information corresponding to a contact in an address book and/or contact list, and so forth. In turn, computing device 102 can automatically identify and/or automate the selection of image 110 based on the context information, such as by searching a local image database that include a tag corresponding to the context information. Alternately or additionally, computing device 102 can obtain image 110 from remote image databases using particular keywords and/or tags as further described herein. To identify context information, images, moments of interest, and/or audio tracks of interest that can be used to associate images with audio tracks, computing device 102 includes context engine module 114, association database 116, and song identifier module 118.

Context engine module 114 represents functionality that collects and/or generates context information about an audio track, such as frequency of playback, location where playback occurs, images captured during playback, dates on which playback occurs, time of day at which playback occurs, devices on which playback occurs, user preferences, communication events that occur during playback, and so forth. Upon collecting context information, context engine module 114 can automatically identify images that correspond to the context information and/or automate user selection of an image as further described herein. Various implementations of context engine module 114 generate keywords and/or tags that describe the context information, and search image database(s) for images that correspond to the keywords and/or tags. The database(s) can be local to computing device 102, remote from computing device 102, or any combination thereof.

Various implementations of computing device 102 generate association information that links an image to an audio track in response to identifying an image that corresponds to an audio track, such as through the use of context engine module 114. When computing device 102 generates the association information, various implementations store the association in association database 116. However, computing device 102 can alternately or additionally store the association information at a remote server and/or remote user device. While describes in the context of computing device 102 generating the association information, various implementations obtain the association information from remote computing devices as further described herein.

Association database 116 stores association information that links an audio track and an image. In some implementations, the association database stores flags, fields, and/or parameters in a data structure, such as a data structure coupled to the audio track and/or image. This can include storing the data structure within a same digital file as the audio track and/or image, as well as storing the data structure in a digital file that separate from the audio track and/or image. To generate the association information, various implementations of context engine module 114 update the flag, field, and/or parameters in the data structure. Alternately or additionally, context engine module 114 can add tags to an image and/or audio track. For example, context engine module 114 can copy an image to a field, insert an address to an image into a parameter, set a flag to indicate there is a personalized image associated with the audio track, and so forth. Some implementations of context engine module 114 instantiate a new data structure within association database 116, and store the association information within the new data structure. As another example, some implementations of association database 116 store the association information as metadata coupled to the audio track and/or image. This can include storing the metadata within a same digital file as the audio track and/or image, as well as storing the metadata in a database separate from the audio track and/or image. In turn, various implementations of playback control module 108 access association database 116 to identify which images to render during playback of an audio track.

Song identifier module 118 represents functionality that recognizes an audio track from audio input. For example, various implementations of song identifier module 118 sample sound captured via a an input microphone and process the samples to identify a particular audio track from the samples. To demonstrate, song identifier module 118 can include, control, and/or couple to an analog-to-digital converter (ADC) that receives an electronic waveform corresponding to analog (audio) input from the input microphone. In turn, the ADC captures samples of the electronic waveform, and passes the samples to song identifier module 118 to process and use for audio track recognition purposes. Song identifier module 118 can be a stand-alone application installed on computing device 102 and/or be a web browser that provides audio track recognition functionality via a third-party web site. While context engine module 114, association database 116, and song identifier module 118 are illustrated in environment 100 as being separate from playback control module 108, some implementations integrate context engine module 114, association database, and/or song identifier module 118 into playback control module 108.

Server 120 represents a remote server from computing device 102 that can be accessed to provide personalized image rendering during playback of an audio track. Server 120 can be a server associated with any suitable type of service provider, such as an audio service provider, an image service provider, a communication service provider, and so forth. Alternately or additionally, server 120 can be part of a cloud server in which multiple hardware and/or software resources are used together to abstract the scaling of various resources, and provide these resources to computing device 102 via the Internet or other networks.

Server 120 includes remote association database 122. Similar to association database 116, remote association database 122 stores association information that can be used to connect an image to an audio track. In some implementations, remote association database 122 stores images that have been marked and/or tagged with various keywords. Alternately or additionally, remote association database 122 stores audio track data and/or information. This can include data structures and/or metadata that include information that ties a particular image to a particular audio track. Accordingly, some implementations of computing device 102 access remote association database 122 (via server 120) to obtain images and/or association information that ties an audio track to an image.

Environment 100 includes communication cloud 124 that generally represents any suitable type of communication network that facilitates a bi-directional link between various computing devices. Communication cloud 124 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, and so forth. In this example, communication cloud 124 connects computing device 102 with server 120 via communication links 126. These communication links generally represent communication paths can be used to exchange any suitable type of data and/or information. Accordingly, communication links 126 represent links to remote devices, examples of which are provided herein.

Figure 2:
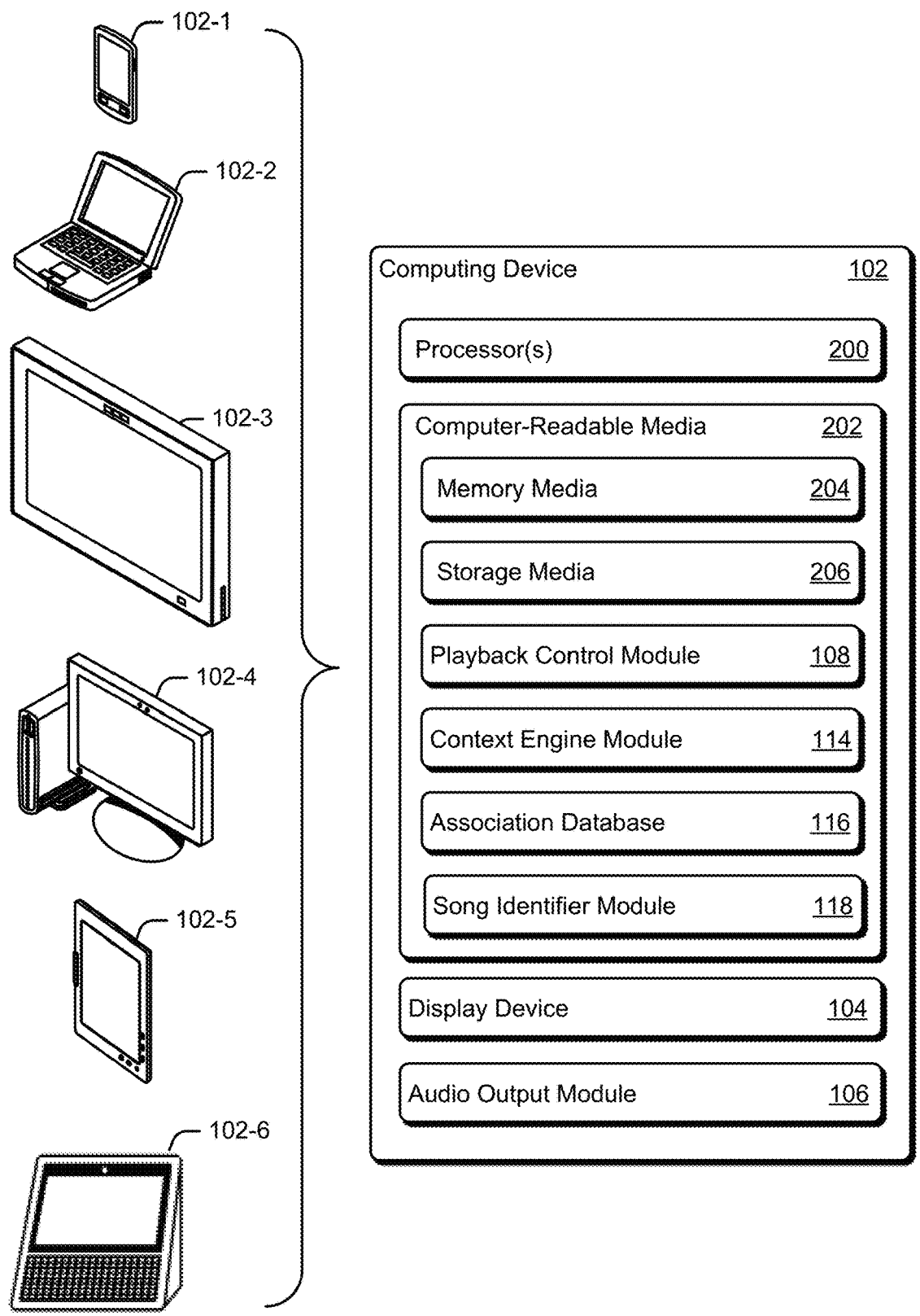
FIG. 2 illustrates a more detailed example of personalized audio playback in various devices in accordance with one or more implementations.

FIG. 2 illustrates an expanded view of computing device 102 of FIG. 1 with various non-limiting example devices including: smartphone 102-1, laptop 102-2, television 102-3, desktop 102-4, tablet 102-5, and home assistant device 102-6. Accordingly, computing device 102 represents any mobile device, mobile phone, client device, wearable device, tablet, computing, communication, entertainment, gaming, media playback, and/or other type of electronic device that incorporates personalized image association during playback of audio as further described herein. A wearable device may include any one or combination of a watch, armband, wristband, bracelet, glove or pair of gloves, glasses, jewelry items, clothing items, any type of footwear or headwear, and/or other types of wearables.

Computing device 102 includes processor(s) 200 and computer-readable media 202, which includes memory media 204 and storage media 206. Applications and/or an operating system (not shown) embodied as computer-readable instructions on computer-readable media 202 are executable by processor(s) 200 to provide some, or all, of the functionalities described herein. For example, various embodiments can access an operating system module that provides high-level access to underlying hardware functionality by obscuring implementation details from a calling program, such as protocol messaging, register configuration, memory access, and so forth.

Computer-readable media 202 includes playback control module 108, context engine module 114, association database 116, and song identifier module 118 of FIG. 1. While playback control module 108, context engine module 114, association database 116, and song identifier module 118 are illustrated here as residing on computer-readable media 202, they can alternately or additionally be implemented using hardware, firmware, software, or any combination thereof.

Computing device 102 also includes display device 104 and audio output module 106 of FIG. 1. As further described herein, display device 104 provides computing device 102 with the ability to render images, while audio output module 106 provides the ability to project audible information.

Having described an example operating environment in which various aspects of personalized audio playback via automated image selection can be utilized, consider now a discussion of automatically identifying audio tracks of interest in accordance with one or more implementations.

Identifying Audio Tracks of Interest

Computing devices today offer many different ways of acquiring and playing audio tracks. For instance, the computing devices enable users to stream audio track from a third party web site, purchase audio tracks from a third party store, copy audio tracks from a compact disk (CD) to a device, and so forth. Audio playback software on the computing device renders a user interface that provides control of which audio tracks are played and when. With the abundance of playback abilities, the user can play audio repeatedly. In turn, when playing the various audio tracks, a user oftentimes recalls memories and/or emotions that are tied to the audio track. For instance, a particular song might remind the user of a special friend or acquaintance, a pleasant evening out at a new restaurant, a memorable holiday with family, and so forth.

As part of the playback experience, some audio playback software visually display images during playback, such as an album cover or a picture of the performing artist. These images provide additional information about the track being played, but lack any personal connection to the user playing the audio track. To provide personalization of an audio track, various implementations provide the user with manual controls to change a displayed image. However, the user may forget to manually change the image, be unable to locate a desired image, or may not have the desired image stored on the device performing the playback. Thus, while manual controls provide a way to personalize playback images, the manual nature of the customization exposes itself to human error.

Various implementations provide automatic image selection as a way to personalize audio track playback. The automatic image selection can use any suitable type of information to select an image, such as context information as further described herein. Accordingly, various implementations gather context information during playback of audio tracks. The context information can be broadly gathered for all audio tracks and/or be gathered for particular audio tracks, such as an audio track that has been identified as being of interest to a user. When an audio track has been identified as being of interest to a user, various implementations automatically select an image based on the corresponding context information and without user intervention. Alternately or additionally, various embodiments automatically prompt the user to select images and/or confirm selection of an automatically identified image. In turn, the selected image can be associated with the audio track such that the image is visibly displayed during subsequent playback of the corresponding audio track.

Figure 3A:
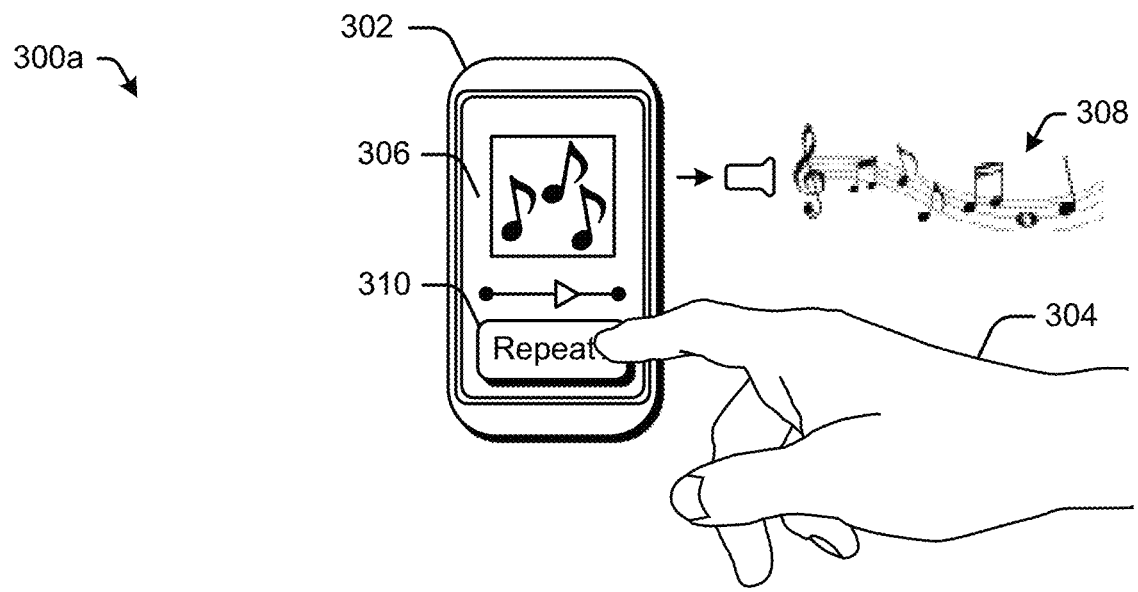
FIGS. 3a and 3b illustrate various examples of identifying an audio track of interest accordance with one or more implementations.
Figure 3A:
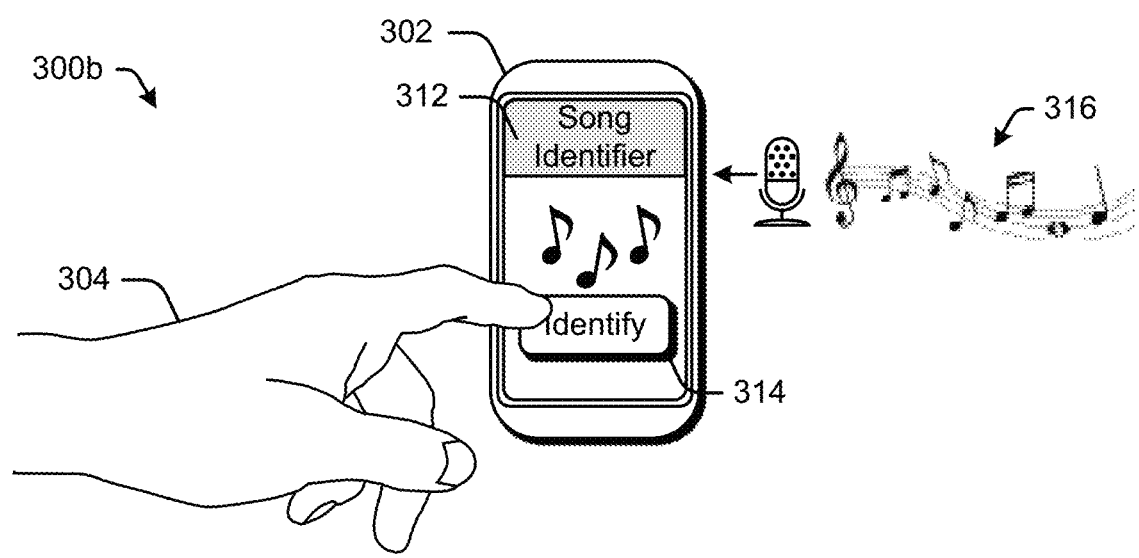
Figure 3B:
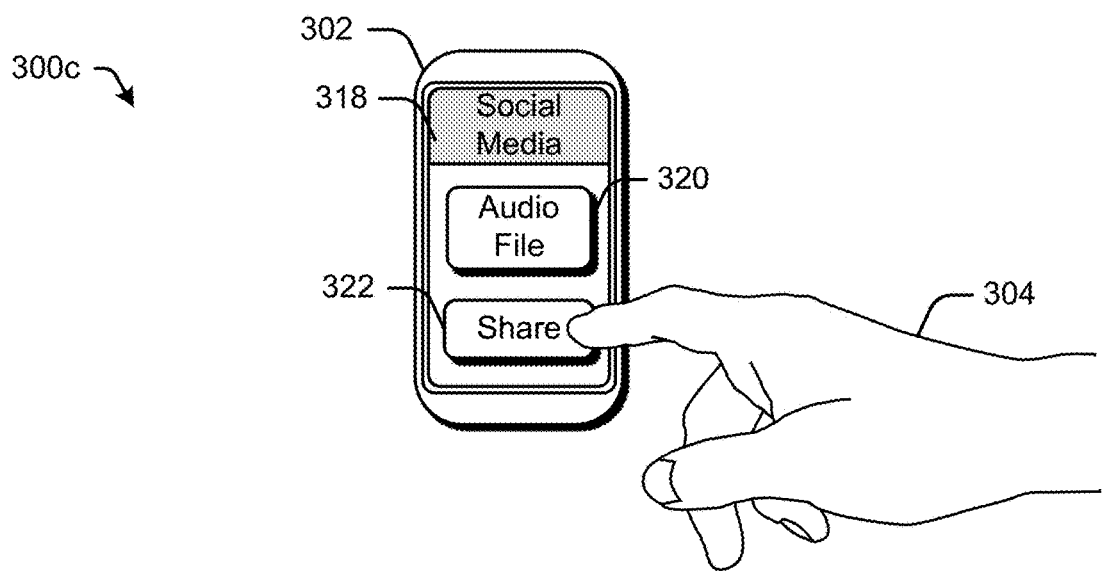
Figure 3B:
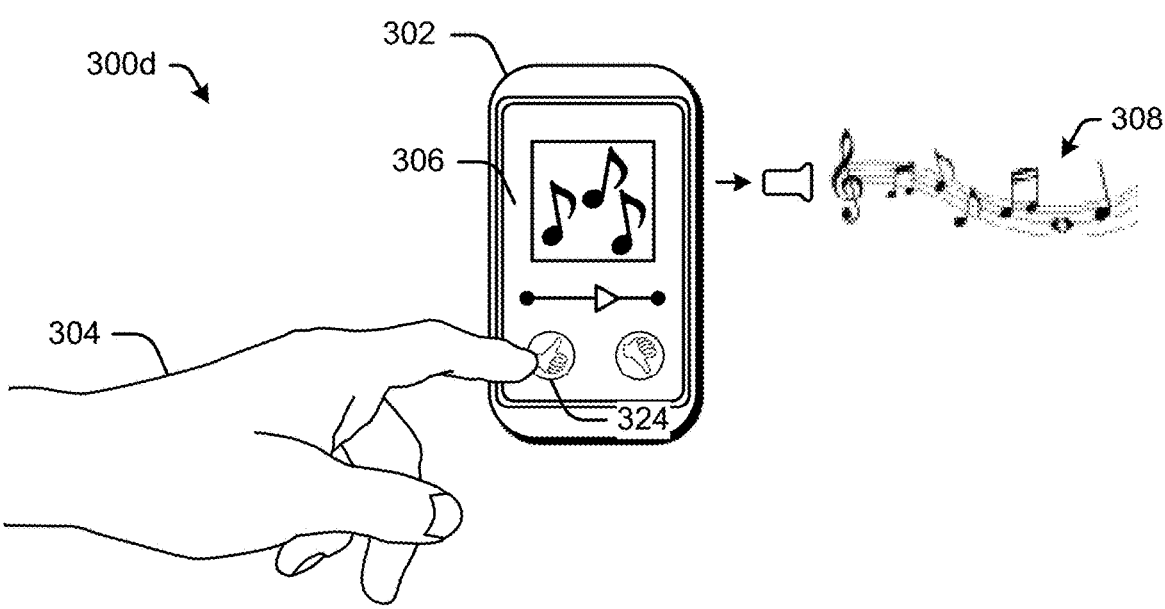

To demonstrate, consider now FIGS. 3a and 3b that illustrate various examples of a computing device identifying preferred audio tracks. FIG. 3a includes environment 300a and environment 300b, while FIG. 3b includes environment 300c and environment 300d. Each respective environment in these figures shows a respective user interaction with computing device 302. Here, computing device 302 is illustrated as a mobile communication device, and is representative of communication device 102 of FIG. 1.

The upper portion of FIG. 3a illustrates environment 300a, where computing device 302 includes touch input capabilities. Accordingly, user hand 304 enters input into computing device 302 through touch input and/or touch input gestures. However, any other type of user input can be received by computing device 302, such as verbal user input, hardware based user input (e.g., a keyboard, a mouse, a stylus, etc.), wireless user input, and so forth. As one non-limiting example, computing device 302 can connect with a second device, such as over a wireless local networking (Wi-Fi) link or a Bluetooth™ wireless link, and receive user input over the link from the second device as the user interacts with the second device.

In environment 300a, computing device 302 displays a user interface 306 associated with audio playback 308. User interface 306 can be associated with any suitable type of application that supports audio playback, such as a browser application, a social media application, an audio player, a storefront application, and so forth. In some implementations, playback control module 108 of FIG. 1 manages user interface 306 as a way for a user to control audio playback. In environment 300a, user interface 306 includes repeat control 310 that restarts audio playback 308 to the beginning when activated. Various implementations track and/or generate a playback count number that indicates how often a user plays an audio track. This can include tracking different ways of initiating playback (e.g., through a repeat control, through a playlist shuffle, through search and select controls, etc.). The playback count number can include information that describes how often a user plays the audio track using a particular application, and/or can be a cumulative playback count number that represents how often the user plays the audio track over different applications. For example, the user may play the audio track using various playback methods, such as over social media, through a web site, through a local playback control module, and so forth. In turn, the playback count number can include playback information for each of these different playback modes, or there can be a respective playback count number for each respective mode of playback.

Upon generating a playback count number, computing device 302 analyzes the playback information to identify audio tracks that are of interest to the user. For example, the computing device can compare the playback count to a predetermined threshold and determine that an audio track is a preferred audio track and/or is of interest to the user when the playback count reaches the predetermined threshold. Alternately or additionally, the computing device can generate statistics using the playback count number for various audio tracks, and identify which audio tracks are played more frequently relative to others. Thus, environment 300a illustrates an example in which preferred audio tracks are identified by computing device 302 monitoring how frequently the audio track is played. In some implementations, the playback count number is associated with a particular user, where computing device 302 allows multiple users to log on with different user profiles, and a respective playback count number is identified for each respective user profile. Alternately or additionally, the computing device 302 generates the playback count number independent of a particular user and/or user profile.

Moving to the bottom of FIG. 3a, environment 300b illustrates another example of how to identify audio tracks of interest through user interactions with computing device 302. In some implementations, environment 300b is a continuation of the example presented in environment 300a. However, instead of displaying a user interface associated with audio playback, computing device 302 displays user interface 312 that is associated with song identification functionality. For instance, user interface 312 can be associated with song identifier module 118 of FIG. 1, a third-party song identification application, a website rendered by a browser, an audio playback control module that provides song identification functionality, a storefront application that provides song identification functionality, and so forth. Here, user interface 312 includes identification control 314 that, when activated by user hand 304, causes computing device 302 to sample incoming audio 316, and discover the identification a particular audio track. Accordingly, in various implementations, computing device 302 tracks and/or counts user interactions associated with discovering the identity of a particular audio track to determine if the audio track is of interest to the user, such as through the use of a threshold and/or statistical analysis as further described herein. Alternately or additionally, the computing device can analyze the audio track discovery metrics in combination with the playback count number to determine when an audio track is of interest to a user. Various implementations couple audio discovery metrics to with a particular user, while other implementations track audio discovery metrics independently of a particular user.

Continuing on, now consider the upper portion of FIG. 3b in which environment 300c illustrates another example of how to identify audio tracks of interest through user interactions with computing device 302. In various implementations, environment 300c is a continuation of the examples presented in environment 300a and/or environment 300b. In environment 300c, computing device 302 displays user interface 318 that corresponds to a social media application, such as a third-party software application, a website user interface displayed by a browser, and so forth. Through various interactions with the social media application (not illustrated here), the user has uploaded audio file 320 to the social media server, and initiates sharing the audio file by selecting share control 322 via user hand 304. Accordingly, various implementations track user interactions associated with sharing the audio file to identify when a particular audio track is of interest to the user, such as through the use of a threshold and/or statistical analysis as further described herein. Alternately or additionally, the computing device can analyze the user interactions associated with sharing the audio file in combination with the playback count number and/or user interactions associated with discovering the identity of an audio track to identify when audio track is of interest to a user. Computing device 302 can associate user interactions related to sharing audio tracks with a particular user, or track the user interactions independently of a particular user as further described herein.

Moving to the lower portion of FIG. 3b, environment 300d illustrates another example of how to identify audio tracks of interest through user interactions with computing device 302. In some implementations, environment 300d is a continuation of the examples presented with respect to environment 300a, environment 300b, and/or environment 300c. Similar to environment 300a, computing device 302 displays user interface 306 that corresponds to the playback of an audio track. However, in environment 300d, user interface 306 includes feedback control 324 that enables the user to enter positive input that the currently playing audio track is a preferred audio track. This is further demonstrated by user hand 304 activating feedback control 324 via touch input to indicate a preference for audio playback 308. Various implementations track user interactions associated with specifying positive feedback to identify when a particular audio track is of interest to the user, such as through the use of a threshold and/or statistical analysis as further described herein. Alternately or additionally, the computing device can analyze the positive feedback in combination with the user interactions associated with sharing the audio file, the playback count number and/or user interactions associated with discovering the identity of an audio track to identify when audio track is of interest to a user. As described with respect to environments 300a-d, computing device 302 can associate the positive user input interactions with a particular user, or track the information independently from a particular user.

By monitoring user input, computing devices can detect when one audio track is preferred over another. While the user can provide direct feedback that indicates a preferred audio track, various implementations discern user preferences from indirect feedback (e.g., repeated playback, social media sharing, audio identification applications, etc.). Since music oftentimes evokes emotional responses from a user, the automatic identification of preferred audio tracks enables a computing device to provide a more personalized experience to a user.

Having described an example of automatically identifying an audio track of interest, consider now a discussion of identifying images to associate with an audio track in accordance with one or more implementations.

Image Association with an Audio Track

As further described herein, various implementations visually display images during playback of an audio track. One such example is the display of cover art corresponding to the current audio track being played, where the displayed cover art changes as the current audio track changes. While the cover art provides a recording artist with the opportunity to visually express ideas about a corresponding audio track, the cover art may fail to provide a personalized connection to the user playing the audio track. While various implementations provide manual controls to customize a displayed image, these manual controls are suspect to human error.

Various implementations automatically initiate customizing a visual display that corresponds to an audio track. For example, upon identifying an audio track of interest, a computing device can automatically launch a user interface that prompts the user to customize an image to associate with the audio track. Alternately or additionally, various implementations gather context information during playback of an audio track, and automatically identify images based on the context information as further described herein. In turn, the computing device can automatically associate the identified images with an audio track without user intervention, and/or present the identified images to the user and prompt the user to make a selection. Accordingly, a computing device can dynamically identify one or more images to associate with an audio track that has been identified as being of interest, and/or automatically associate the image(s) with the audio track for playback.

Figure 4:
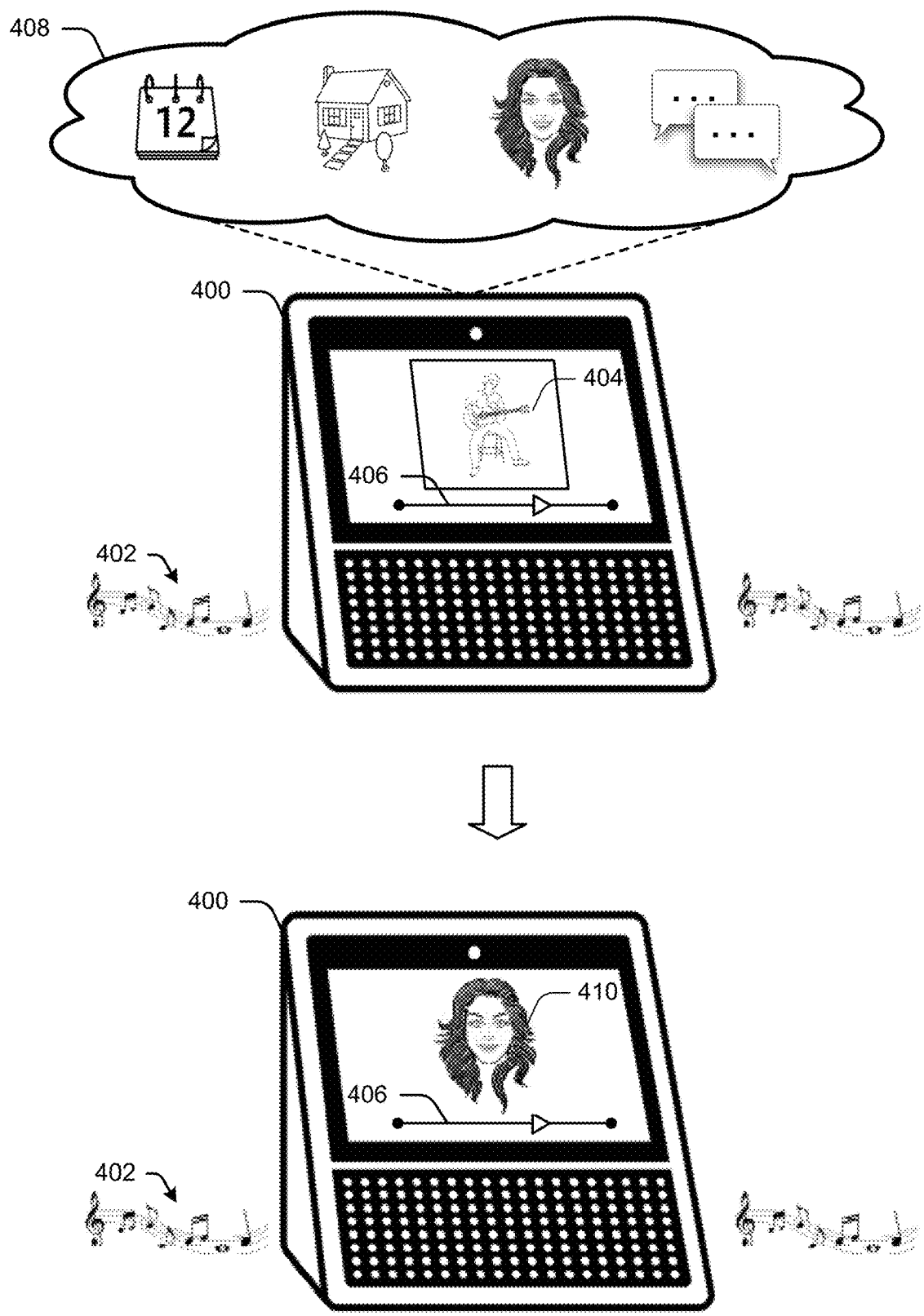
FIG. 4 illustrates an example of collecting context information used to identify images in accordance with one or more implementations.

To illustrate personalizing audio playback based on context information, consider now FIG. 4. The upper portion of FIG. 4 includes home assistant device 400 that includes the capability of outputting audible information. Here, home assistant device 400 audibly projects music 402 that corresponds to an audio track, such as through the use of playback control module 108 of FIG. 1.

During audio playback in the upper portion of FIG. 4, the home assistant device displays image 404 and (optionally) a progression control 406. Image 404 represents an artist's album cover to the audio track that corresponds to music 402, while progression control 406 provides control of audio playback and/or a visible indication of the playback progression. Since image 404 corresponds to the artist's album cover, the rendered content lacks personalized information associated with a user who initiated playback of music 402. Accordingly, various implementations automate associating an image with an audio track by gathering context information during playback of the audio track.

In the upper portion of FIG. 4, home assistant device 400 collects context information 408 during playback of the audio track corresponding to music 402. The context information can be any suitable type of information, such as a date and/or time, a location, users who are recognized as being present, users who are engaged in a communication event using home assistant device 400, and so forth. For instance, home assistant device 400 can use a global positioning system (GPS) and/or location information included in communication exchanges to identify a current and/or particular location during playback of music 402, such as a particular restaurant, store, hotel, residence, city, street, and so forth. As another example, some implementations use voice recognition software and/or facial recognition software to known individuals that are within a predetermined proximity of home assistant device. Identifying a particular person can include using microphones, cameras, and/or radio frequency (RF) signals to capture signals and/or images that can be subsequently analyzed to extract characteristics that can then be used to identify the particular person. Home assistant device 400 can also monitor what communication events are occurring during playback of music 402 and identify a particular user engaged in the communication event. For instance, if a user employs the home assistant device to initiate and/or receive an instant message exchange, a text message exchange, a real time voice call, and so forth, the home assistant device can determine the various participants in the communication event, such as through the use of a corresponding contact list, address, etc.

The context information illustrated in FIG. 4 in not intended to be limiting, and it is to be appreciated that other types of context information can be gathered during playback of an audio track. This can include gathering context information when other images and/or applications have the primary focus of a computing device instead of a playback control module. For example, consider a scenario in which a user initiates playback of an audio track on a computing device, and then switches applications from the playback control module to another application, such as an email client or an image viewing application. Various implementations can gather context information based on user interactions with these other applications. For example, in the scenario in which the user switches to an image viewing application, the home assistant device can identify which images are viewed during playback, whether a same image is repeatedly viewed during playback, identify images that including a same person as the frequently viewed image, and so forth. Accordingly, various implementations identify a relationship between the audio track being played and image(s) being viewed during playback, and automatically determine to associate images being viewed during playback with the audio track. In other words, the computing device gathers context information corresponding to images that the user repeatedly views during playback of a particular audio track (either repeatedly during a single playback event or multiple playback events), and determines to associate the repeatedly viewed images with the particular audio track and/or prompt the user to make this association as further described herein. Alternately or additionally, in associating an image with an audio track, some implementations form the association by associating a particular person with the audio track, and select image(s) that include the particular person as image(s) to associate with the audio track.

Various implementations generate keywords and/or tags based on the context information, and used these keywords and/or tags to identify images. To further demonstrate, consider a scenario in which home assistant device 400 includes a communication client that is engaged in a communication event with a remote participant. Home assistant device 400 can gather context information that corresponds to the remote participant and/or communication event, such as a name associated with the remote participant, a location at which the remote communication is occurring, a time zone at which the remote participant operates, a date of the communication event, and so forth. In turn, the home assistance device can generate keywords and/or tags as part of the context information gathered about the communication event and/or remote participant (e.g., the user profile name, an identified city, a continent name, etc.), and store the keywords and/or tags in a data structure as context information. Alternately or additionally, the data structure can include information to couple the context information with a particular audio track as further described herein. Upon generating the context information and/or keywords, some implementations dynamically update the data structure with new context information to generate cumulative context information, while other implementations replace the context information in the data structure.

In the lower portion of FIG. 4, home assistant device 400 has automatically selected image 410 as having an association with the audio track corresponding to music 402 based on context information 408. For example, if the context information includes a particular date and/or time, home assistant device 400 can search for events on that particular date (e.g., a birthday, a dinner appointment, a scheduled holiday, and so forth) and find images corresponding to the event. Alternately or additionally, the home assistant device can search for images captured on that particular date, such as an image captured by the home assistant device, an image captured by another device associated with a user logged on to the home assistant device, an image remotely stored on a cloud server, and so forth. As another example, home assistant device 400 can search various image databases for images associated with a keyword and/or tag stored in the context information.

To search for an image, home assistant device 400 can use a single piece of context information, or use multiple pieces of context information. For example, the home assistant device can search for an image that has both a same location and a particular user as identified in context information 408. Home assistant device 400 can also search any number of image databases, such as by searching local database for image(s), searching and/or querying social media for images, searching feeds for images, searching cloud storage, and so forth, to identify image 410 as being an image to associate with the corresponding audio track. Accordingly, when the home assistant device plays back the audio track in the lower portion of FIG. 4, image 410 is rendered in the display instead of image 404.

In some implementations, home assistant device automatically provides the user with options to associate images with an audio track. In other words, the home assistant device automatically renders user interfaces upon identifying an audio track of interest that enable the user to select images to associate with an audio track. To demonstrate, consider now FIGS. 5a-c that illustrate example user interfaces in accordance with one or more embodiments. In various implementations, the examples described with respect to FIGS. 5a-c can be considered continuations of the various examples described with respect to FIGS. 1-4.

Figure 5A:
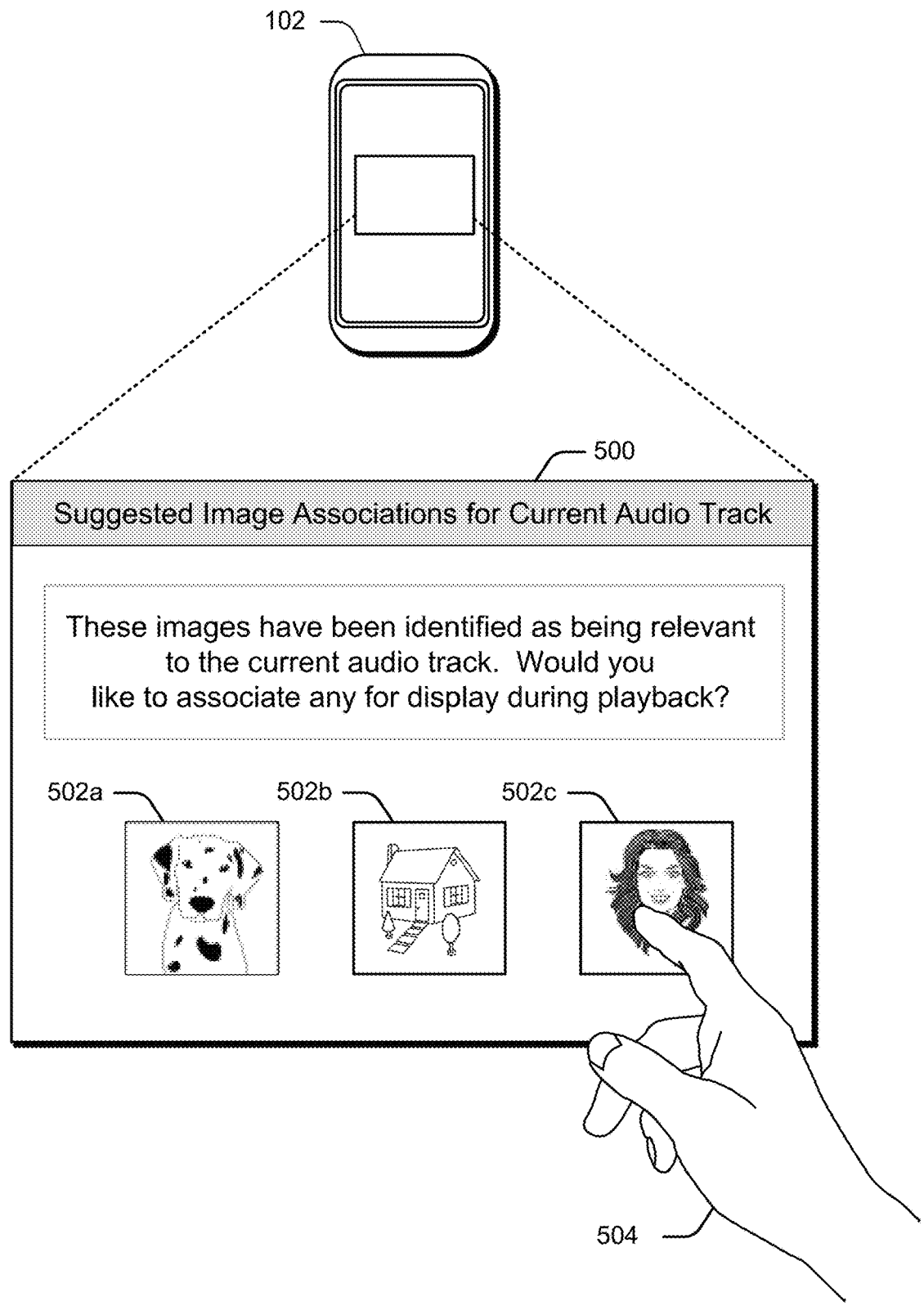
FIGS. 5a-c illustrate example user interfaces that can be displayed upon identifying an audio track of interest in accordance with one or more implementations.

FIG. 5a includes user interface 500 that represents an example display rendered by computing device 102 of FIG. 1. Here, computing device 102 renders user interface 500 during playback of an audio track that has been identified as a preferred audio track. However, user interface 500 can rendered at any other suitable time, such as when the computing device identifies an association between an image and an audio track, at the end of playback of an audio track, and so forth.

User interface 500 includes three images that have been automatically identified as having an association with a particular audio track: image 502a, image 502b, and image 502c. Here, image 502a corresponds to a profile picture of a remote user who has been engaged in a communication exchange with the computing device, image 502b corresponds to a location identified during playback of the audio track, and image 502c corresponds to an image captured during playback of audio track. Accordingly, various implementations use context information to automatically identify and present images to a user as candidate images to associate with an audio track. In this example, user hand 504 manually selects image 502c in response the prompt displayed by user interface 500, but various implementations alternately or additionally provide the ability to select multiple images. In turn, computing device 102 associates the selected image(s) with the identified audio track, and subsequently displays the selected image(s) during playback of the audio track. This can include replacing any current images associated with the audio track with the newly selected image(s) and/or appending the newly selected image(s) to a current list of associated images. By automatically rendering user interface 500, computing device 102 reduces the number of actions performed by the user to associate an image with an audio track relative to a manual process in which the user initiates the association process. To illustrate, manual initiation of the association process includes the user navigating to a control to initiate the association process, then navigating to an image of choice, and then performing the actions used to select and associate an image. The automatic rendering of user interface 500 simplifies the process by providing the user with images to select for association with one action.

Figure 5B:
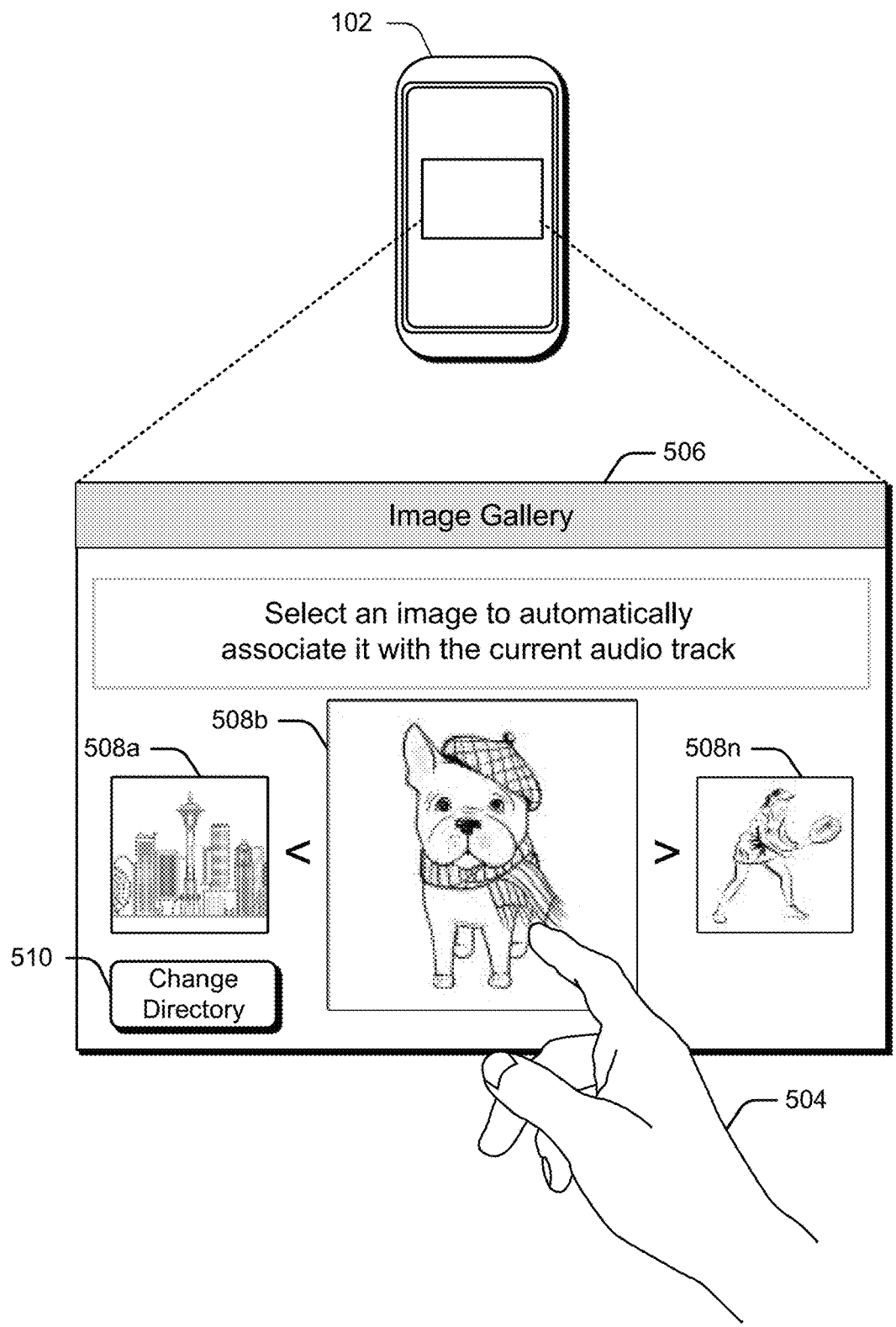

FIG. 5b illustrates another example user interface 506 that can be automatically rendered by computing device 102 in response to identifying an audio track of interest. Here, user interface 506 displays multiple images via an image gallery that are stored locally on computing device 102. Alternately or additionally, user interface 506 displays remote images, such as images stored in social media, a web server, and so forth. In FIG. 5b, the image gallery displays image 508a, image 508b through image 508n, where n represents an arbitrary number. User interface 506 also includes a navigation control 510 that enables a user to navigate to other locations and/or other images. To designate an image for association with an audio track, user hand 504 selects image 508b using input touch, but other forms of user input can be utilized as well, such as a pull-down menu, a control button, radio button, and so forth. By automatically rendering user interface 506, computing device 102 simplifies the image association process relative to a manual process, as further described herein. The image gallery can select the images to render in any suitable manner, such as by selecting images in a location the user most often visits for viewing images, images located at a default image database location, and so forth.

Figure 5C:
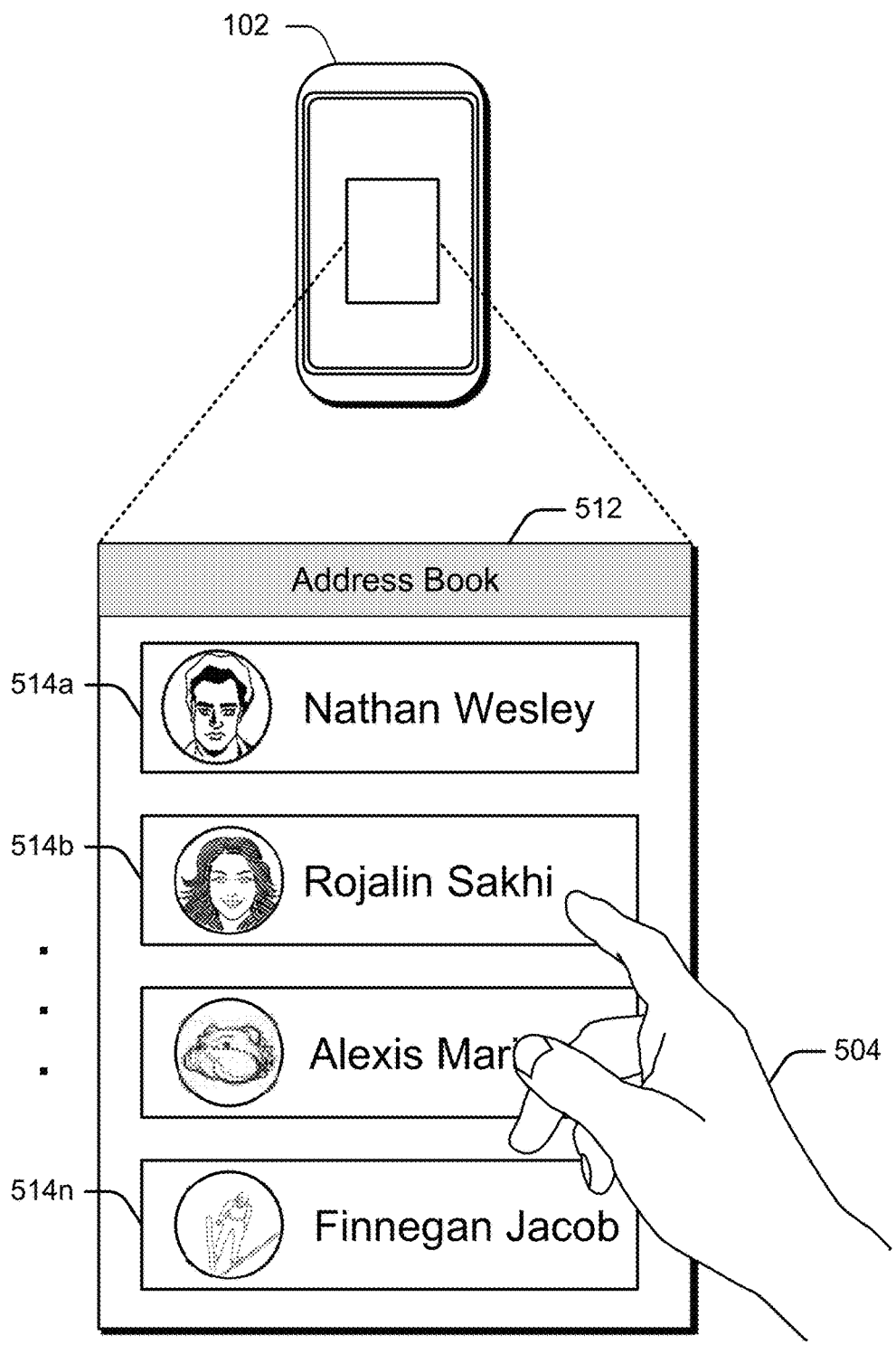

FIG. 5c illustrates another example user interface 512 that can be automatically rendered by computing device 102 in response to identifying an audio track that is of interest. In FIG. 5c, user interface 512 displays an address book with a contact list that includes contact 514a, contact 514b through contact 514n, where n represents an arbitrary number. Since computing device 102 renders user interface 512 in response to identifying an audio track of interest, user hand 504 selects contact 514b to associate with the audio track. In turn, computing device 102 associates the avatar and/or profile picture corresponding to contact 514b with the audio track, and subsequently displays the profile picture during playback of the audio track as further described herein. Alternately or additionally, computing device 102 uses information about the selected contact, such as the contact name, to search for images tagged with that information. Any or all of the identified imaged can then be associated with the audio track for rendering during playback. By automatically rendering user interface 512, computing device 102 simplifies the image association process relative to a manual process as further described herein.

Computing device 102 can use various data structures to not only store context information, but additionally store association information that couples an image to an audio track. Thus, various implementations generate and/or access a data structure in a database to obtain data, such data with information that describes keywords use to search for images and/or data with information that describes which image(s) are associated with a particular audio track. The data can describe any type of information, such as address information, location information, name/file identifiers, revision information, and so forth. Some implementations configure the data structure as a linked list in order to associate multiple images with a particular audio track. In turn, various entities, such as playback control module 108 of FIG. 1, can provide a more personalized experience to the user by accessing the data structure and process the information stored in the data as a way to identify images to render during playback of a particular audio track. Accordingly, various implementations define the data structure according to a set of rules that provide a mechanism for cross-entity data sharing as well as predictable and repeatable processing by different entities to achieve expected results. For example, the set of rules can outline what type of information the data included in the data structure describes, an amount of data stored within the data structure, a format in which the data is stored within the data structure, and so forth. By following these rules, a first entity can create and store a data structure such that a second entity can successfully access and interpret the data included in the data structure.

Figure 6:
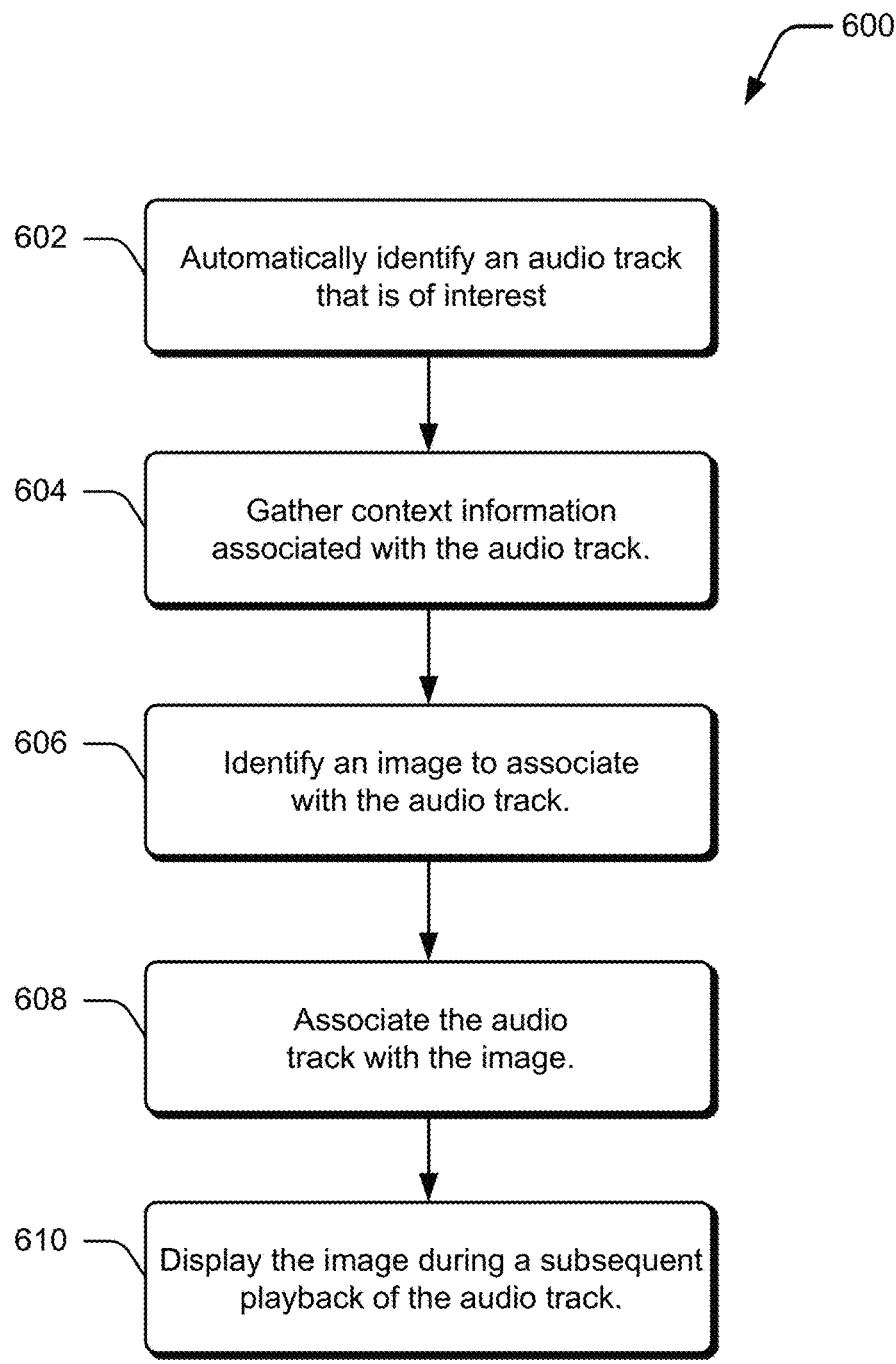
FIG. 6 illustrates a flow diagram that automates the personalization of audio playback in accordance with one or more implementations.

FIG. 6 illustrates a method 600 that automatically associates an audio track with an image based on context information in accordance with one or more implementations. The method can be performed by any suitable combination of hardware, software, and/or firmware. In at least some embodiments, aspects of the method can be implemented by one or more suitably configured hardware components and/or software modules, such as playback control module 108, context engine module 114, and/or association database 116 of FIG. 1. While the method described in FIG. 6 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 602, a computing device automatically identifies an audio track that is of interest, such as by tracking how often the audio track is played, how often the audio track is shared with other devices, how often the audio track is identified from an audio clip, and so forth. In some implementations, the computing device identifies audio tracks of interest for a particular user (e.g., a user profile logged onto a device), while in other implementations, the computing device identifies audio tracks of interest independent of the particular user. To identify an audio track of interest, the computing device can use information generated locally to the computing device and/or pull tracked information from other devices. For example, some user have multiple computing device, where each respective computing device has an ability to playback audio tracks. Various implementations analyze audio playback tracking information from each respective computing device to determine when an audio track is of interest to a user.

At 604, the computing device gathers context information associated with the audio track. Any type of context information can be gathered, examples of which are provided herein. In some implementations, the computing device first gathers context information about an audio track, and then subsequently identifies whether the audio track is an audio track of interest for not. Thus, while method at 600 illustrates that an audio track is identified as being of interest ahead of gathering context information about the audio track, other implementations can reverse the order in which these processes are performed. Various implementations store the context information in a database, such as in a data structure that associates the context information with a particular audio track. This can be a continuous process such that the context information is updated each time the particular audio track is played. Accordingly, the stored context information can be cumulative over time, where the stored information represents context information gathered from multiple different playback events of the same audio track.

Upon gathering context information and identifying an audio track of interest, the computing device identifies an image based on the context information at 606. In various embodiments, the computing device identifies an image by automatically displaying a user interface that prompts the user to select an image, and subsequently receiving selection of an image from the user, examples of which are provided herein. Alternately or additionally, the computing device automatically identifies an image by using the context information to search for images. As one example, the computing device can access a data structure that stores the context information to extract keywords and/or tags words, identify various characteristics corresponding to audio playback, and so forth. In turn, the computing device uses the keywords, tags, and/or characteristics to search for images. Some implementations search locally for images (e.g., images stored on the computing device). However, the computing device can also search and/or query remote servers for images as well.

Figure 7:
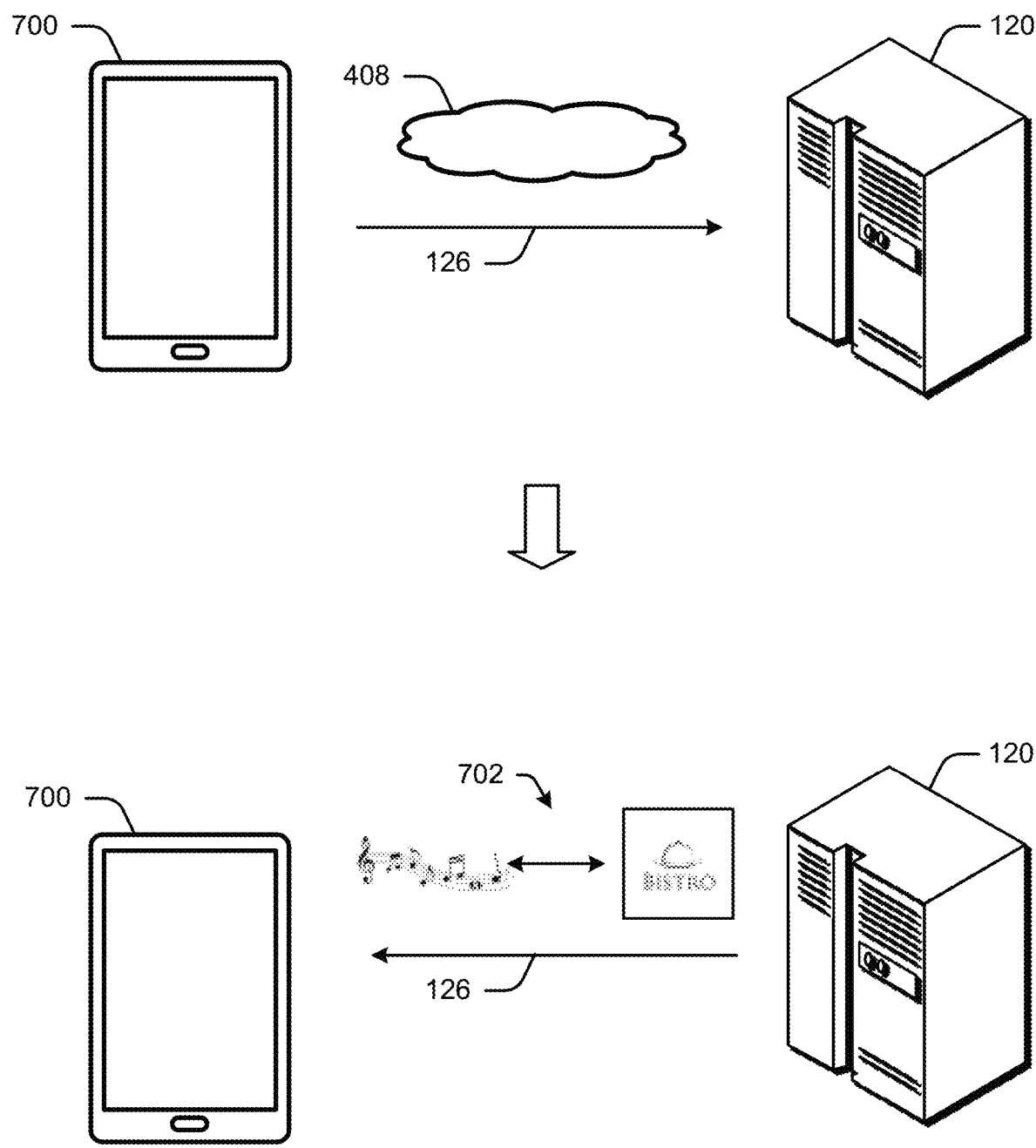
FIG. 7 illustrates an example of sharing audio track associations based on context information in accordance with one or more implementations.

To demonstrate an example of a computing device accessing a remote server to obtain an image and/or association information, consider now FIG. 7. In various implementations, the example described with respect to FIG. 7 can be considered a continuation of the various examples described with respect to FIGS. 1-6. FIG. 7 includes computing device 700 in the form of a tablet, and server 120 of FIG. 1. To identify an image to associate with an audio track, computing device 700 transmits a request to server 120 of FIG. 1 using communication links 126. In various embodiments, the request includes context information 408 of FIG. 4. For simplicity's sake, this request is illustrated as a single arrow originating from computing device 700 and directed to server 120, but it is to be appreciated that multiple messages may be transmitted back and forth between multiple entities to form a complete request.

In response to receiving the request, server 120 transmits a response back to computing device 700 over communication links 126. Here, the response generally includes information 702 to indicate that any suitable type of information can be returned. Some implementations of server 120 use the context information received in the request from computing device 700 to search for images that match and/or are identified as being relevant to the context information. In turn, a server 120 transmits the image(s) to computing device 700. Alternately or additionally, server 120 returns association information that couples an audio track to an image. This can include association information for a same audio track that has been identified by computing device 700 as being an audio track of interest, as well as association information for different audio tracks. Accordingly, a computing device can automatically identify an image to associate with an audio track by forwarding the context information and/or a request to a remote server.

Returning to method 600, the computing device associates the audio track with the image at 608. This can include the computing device automatically associating the audio track with an image the computing device has automatically identified, as well as the computing device associating the audio track with an image selected by the user via a user interface as further described herein. Various implementations associate the audio track with the image by creating a data structure to hold data that describes the association, and then storing the data structure in a database, such as association database 116 and/or remote association database 122 of FIG. 1. Alternately or additionally, the computing device can update an existing data structure with newly formed association information between the audio track and the image and/or association information received from a remote server.

At 610, the computing device displays the image during a subsequent playback of the audio track. For instance, the next time the computing device plays the audio track, the image is rendered visibly during the playback. Alternately or additionally, a different computing device can obtain the association, and render the image during playback as well. Accordingly, the association can be shared among devices such that various devices personalize the playback experience.

Figure 8:
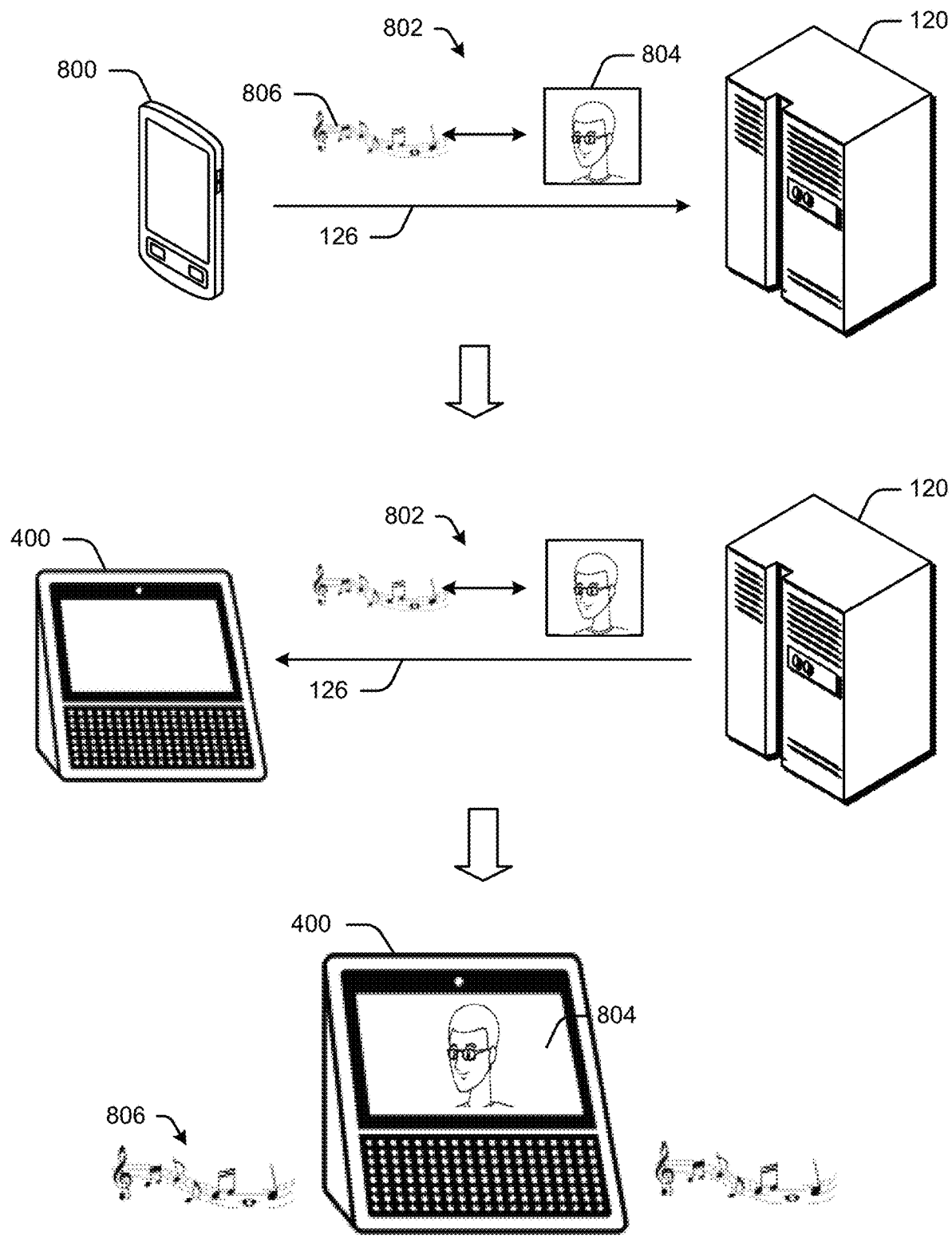
FIG. 8 illustrates an example of sharing audio track associations across multiple devices in accordance with one or more implementations.

To demonstrate, consider now FIG. 8 that illustrates an example of sharing an image association with an audio track between multiple devices. In various implementations, the example described with respect to FIG. 8 can be considered a continuation of the various examples described with respect to FIGS. 1-7.

FIG. 8 includes computing device 800 in the form of a mobile communication device, and server 120 of FIG. 1. In the top-most portion of FIG. 8, computing device 800 has formed an association between an image and a particular audio track. The association can be tied to a particular user profile, or can be independent of any user profiles as further described herein. Upon forming the association, computing device 800 shares the association information with server 120, such as by pushing a data structure to server 120 for storage. While described here as computing device 800 pushing the information to a server without having received a request for the information, computing device 800 can alternately or additionally transmit the association information in response to a request. Accordingly, whether pushed or pulled, computing device 800 transmits information 802 to server 120 over communication links 126. Alternately or additionally, computing device 800 can transmit information to another user device, such as a user device that shares the same user profile and/or has a local wireless link to computing device 800. Information 802 generally represents any suitable type of information that can be used to associate an image with an audio track. Here, information 802 includes image 804 and data that identifies audio track 806, but any other type of information can be transferred without departing from the scope of the claimed subject matter.

Moving to the middle of FIG. 8, home assistant device 400 of FIG. 4 receives information 802 from server 120 over communication links 126. For example, home assistant device 400 can log onto a music server with a same user profile as used by computing device 800. Upon obtaining access to the music server, home assistant device 400 can send a request (not illustrated here) for information 802, or server 120 can push information 802 to home assistant device 400 independent of receiving a request. Accordingly, various implementations transfer information 802 between devices. This can alternately or additionally include devices that share a local link rather than through a network, such as two devices wirelessly coupled using a Bluetooth™ connection.

Continuing on to the bottom of FIG. 8, home assistant device 400 initiates playback of audio track 806. In response to obtaining information 802 from server 120, home assistant device 400 renders image 804 during the playback based on the association data in information 802. Thus, even though the association between image 804 and audio track 806 originated at computing device 800, home assistant device 400 provides a personalized audio experience to the user due to the transfer of information 802 between devices.

By automatically identifying audio tracks of interest, as well as identifying images that correspond to the audio tracks, various computing devices can tailor audio playback to a personalized experience. As one example, a computing device can monitor and identify when the user repeatedly views a same image during playback of a particular audio track, associate the image with the audio track and/or prompt the user to associate the image with the audio track. In turn, this configures the playback into an experience designed to invoke memories and/or emotions from the user by rendering the relevant and/or identified images. The automatic nature of identifying audio tracks and/or images simplifies the ability to configure playback for this experience relative to a manual process that is more prone to human error (e.g., inadvertently forgets to configure, manually selects a unrelated image, etc.).

Having described an example of image association with an audio track, consider now a discussion of identifying externally playing audio tracks during moments of interest in accordance with one or more implementations.

Identifying Externally Playing Audio Tracks During Moments of Interest

Various computing devices provide a user with the ability to playback audio, whether it is through a web based interface or local application. When the user initiates playback of a particular audio track, a computing device can track various aspects about the audio track, such as how often the user plays it, to identify when the user has interest in the audio track. In turn, the computing device can acquire context information during playback of the audio track, and use the context information to personalize the images that are rendered during a subsequent playback of the audio track. However, computing devices can alternately or additionally identify audio tracks external to the computing device during moments of interest.

Figure 9:
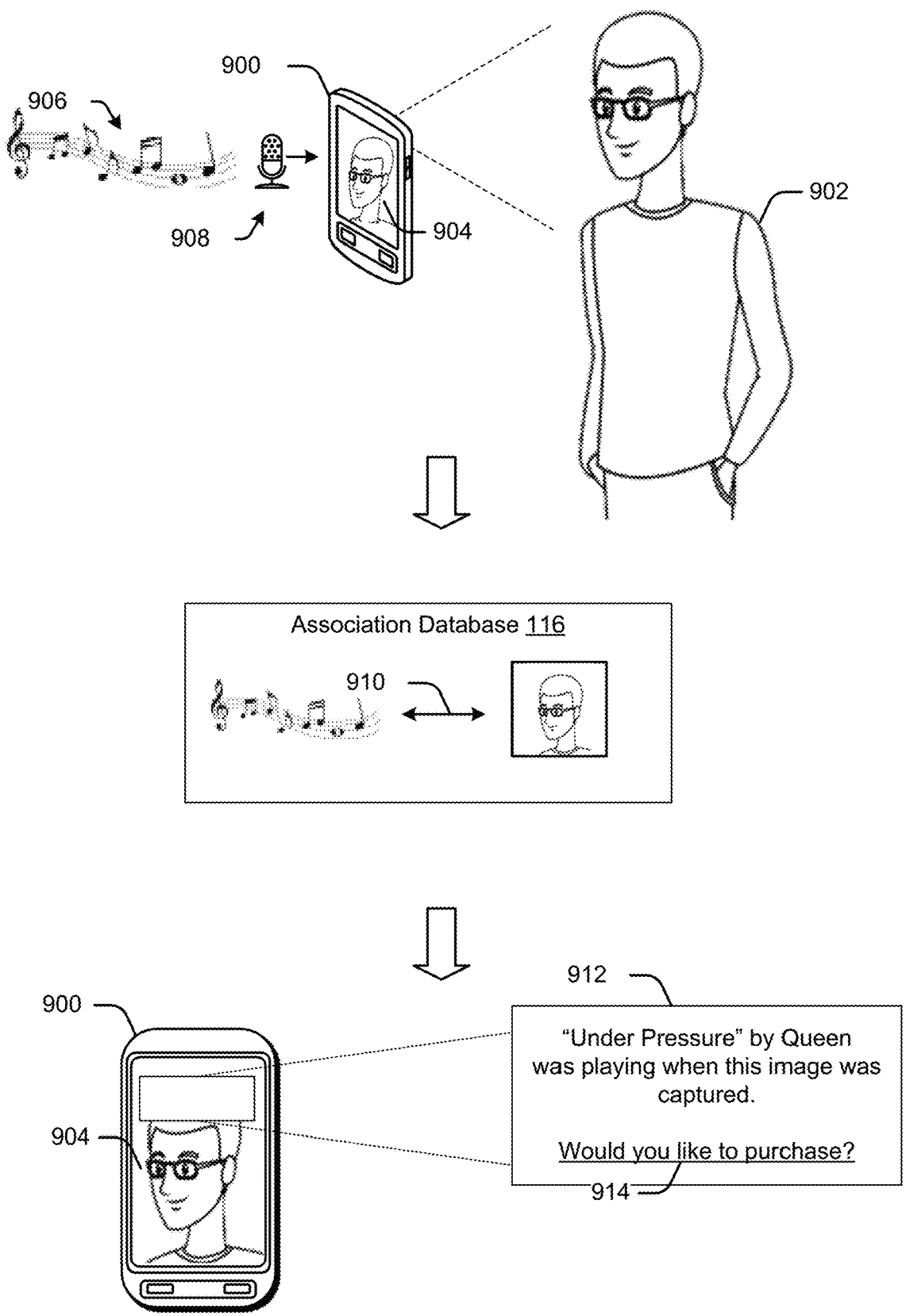
FIG. 9 illustrates an example of identifying an external audio track during a moment of interest in accordance with one or more implementations.

To demonstrate, consider FIG. 9 that illustrates an example of identifying an audio track playing external to a computing device during a moment of interest in accordance with one or more implementations. In various implementations, the example described with respect to FIG. 9 provides a continuation of the various examples described with respect to FIGS. 1-8.

FIG. 9 includes computing device 900 in the form of a mobile communication device, and person 902. Computing device 900 represents any suitable computing device with the ability to identify audio tracks playing external to a device during moments of interest, such as computing device 102 of FIG. 1. In the top-most portion of FIG. 9, a user interfaces with computing device 900 to capture image 904 of person 902. Various implementations determine that since the user is actively capturing an image, the moment is an important moment for the user. Here, the phrase "important moment" is used to signify a moment that is distinct from other moments and/or a moment that has more importance to the user relative to other moments.

To preserve the moment and/or identify other characteristics about the moment, computing device 900 attempts to identify whether music is being played external to the computing device. Alternately or additionally, computing device 900 displays a prompt to the user, such as "Identify song playing?" that initiates the song identification process when activated by the user. Whether performed automatically or prompted by the user, computing device 900 gathers input samples of music 906 through microphone 908, and processes them to identify what particular audio track corresponds to music 906. In some implementations, the processing can be performed by a suitably configured application executing on computing device 900, such as song identification module 118 of FIG. 1. Alternately or additionally, computing device 900 can submit the samples of music 906 to a third-party song identification website as further described herein.

Moving to the middle of FIG. 9, the computing device automatically forms an association 910 between the captured image (e.g., image 904) and the audio track corresponding to music 906, such as by storing information in a data structure that can be used to couple the audio track with the captured image. Alternately or additionally, some implementations save the audio track information as a music tag associated with the captured image and/or a corresponding album in which the captured image resides. The association information and/or tag information can be stored locally on the computing device, forwarded to a remote server for storage, or any combination thereof. In this example, computing device 900 stores association 910 in association database 116 of FIG. 1, but it is to be appreciated that the association information and/or tag information can be forwarded to external devices as further described herein.

When the captured image includes a music tag, various implementations access the music tag to provide further personalization to the user. For example, consider a scenario in which the user views the captured image at a later point in time. When the user views the captured image, computing device 900 can access the music tag and notify the user that the corresponding audio track was playing during capture of the image, such as by displaying an overlay on top of the captured image that states "This audio track was playing during the image capture". Computing device 900 can also determine whether the corresponding audio track already resides on computing device 900 and/or the user already has access the audio track through a personal audio playlist, music server, etc. In such a scenario, some implementations display a prompt and/or a link to the user that provides access to purchasing and/or downloading the audio track. One such example is a display prompt that states "Would you like to purchase this audio track" coupled with a link to a storefront that allows the user to purchase and download the audio track.

Continuing to the bottom portion of FIG. 9, computing device 900 automatically displays prompt 912 to the user when image 904 is subsequently displayed at a later point in time. Here, prompt 912 is overlaid on top of image 904, but it is to be appreciated that prompt 912 can be displayed in any other suitable manner. To provide a personalized experience to the user, computing device 900 accesses the association information 910, and supplies the user with context information about what music was playing during the capture of image 904. Prompt 912 also includes hyperlink 914 that redirects the user to a storefront when activated. Accordingly, various implementations recognize the occurrence of moments of interest, obtain various characteristics about that moment, and provide information about the moment of interest to the user at a later point in time.

Figure 10:
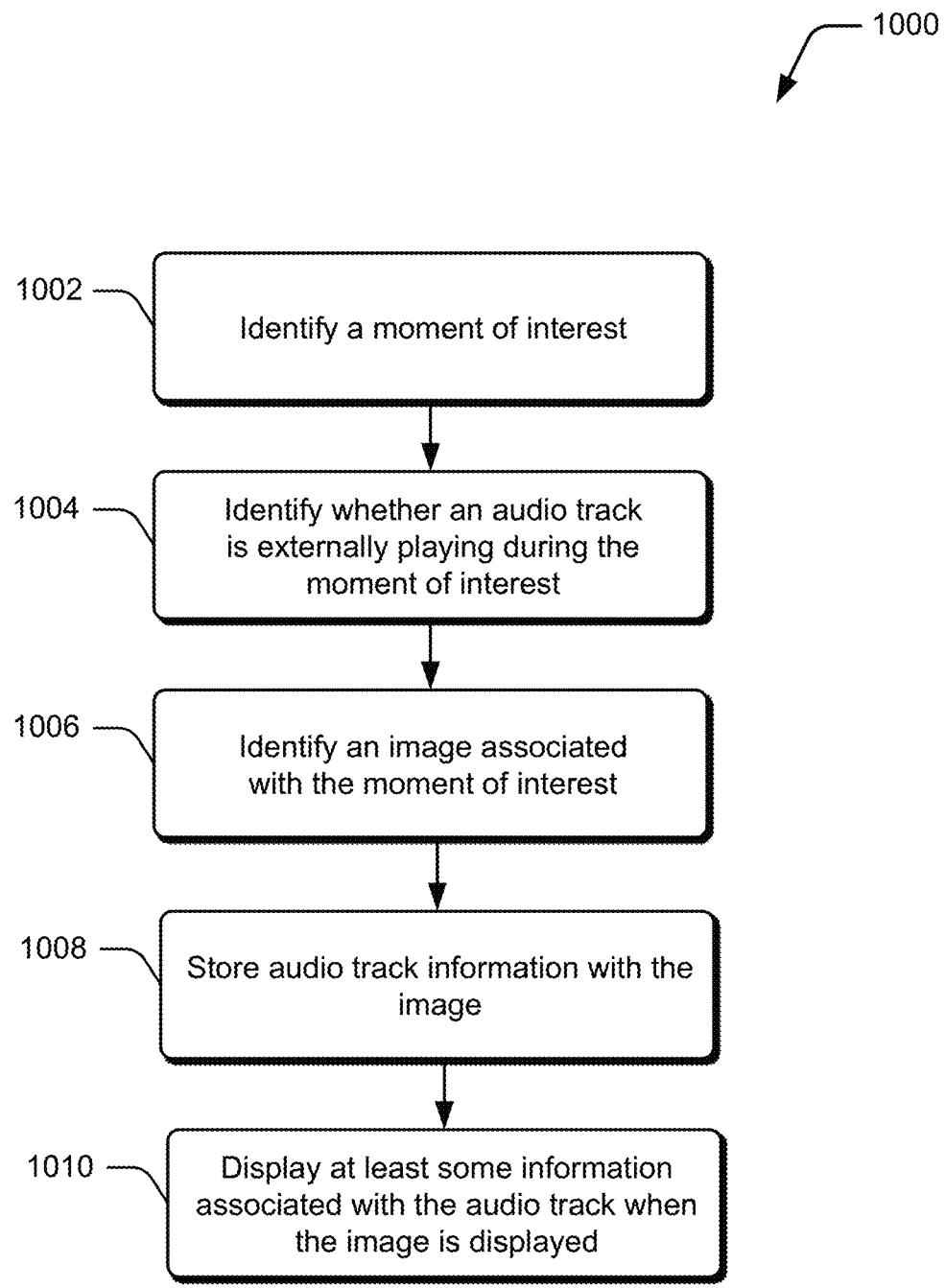
FIG. 10 illustrates a flow diagram that identifies externally playing audio during moments of interest in accordance with one or more implementations.

FIG. 10 illustrates an example method 1000 that identifies external audio tracks during moments of interest in accordance with one or more implementations. The method can be performed by any suitable combination of hardware, software, and/or firmware. In at least some embodiments, aspects of the method can be implemented by one or more suitably configured hardware components and/or software modules, such as playback control module 108, context engine module 114, association database 116, and/or song identifier module 118 of FIG. 1. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, a computing device identifies a moment of interest. For instance, the computing device can determine that when an image and/or video is being captured, that the current actions correspond to a moment of interest, and thus the moment has more importance to the user relative to other moments. However, other types of moments can be identified as being moments of interest as well, such as when a user is posting positive input on social media, sharing an image, participating in a communication exchange, and so forth.

Responsive to identifying the moment of interest, the computing device identifies whether an audio track is externally playing during the moment of interest at 1004. Identifying the audio track can occur automatically by the computing device, or in response to the user requesting song identification. For instance, some implementations display a prompt to the user that asks to activate a song identification process. Whether automatically or in response to receiving confirmation to activate the song recognition process, the computing device initiates capturing external audio, such as through the use of an ADC that is coupled to a microphone that captures audio from the surrounding area external to the computing device. In turn, the ADC generates digital samples of the audible input, and forwards the samples to a song identifier application, such as song identifier module 118 of FIG. 1. In various implementations, after identifying an audio track that is externally playing, some implementations validate the identified audio track as being an audio track of interest as further described herein.

Upon identifying that an audio track is externally playing during the moment of interest, the computing device identifies an image associated with the moment of interest at 1006. For instance, if the computing device determines that an image is actively being captured during the moment of interest, various implementations identify the captured image as being associated with the moment of interest. As another example, if the user is sharing an image on social media during the moment of interest, various implementations identify the shared images as being associated with the moment of interest. The computing device can automatically identify the image for association with the audio track and/or automatically prompt the user to confirm selection of the image for association as further described herein.

At 1008, the computing device stores audio track information with the image. Some implementations store a music tag with the image that identifies the audio track. Alternately or additionally, the computing device generates association information that ties the audio track with the image, examples of which are provided herein. The music tag and/or association information can be stored in local database, forwarded to remote devices, or any combination thereof.

At 1010, the computing device displays at least some information associated with the audio track when the image is displayed. For instance, if the image is viewed in an image gallery and/or a photo slide show, some embodiments access the music tag, and display a notification of what audio track was playing during capture of the image. This can include displaying a control with the notification that causes the computing device to obtain and/or download the audio track when activated.

By identifying externally playing audio tracks, as well as moments of interest to the user, a computing device increases the probability of providing the user with a personalized experience relative to not performing these identification processes. For example, in the scenario in which the user is actively capturing an image and/or video, the user may hear the audio track during the image capture, but forget to manually perform an association between the audio track and the captured image. By automatically forming the association and/or prompting the user to form the association, the computing device helps provide the user with a personalized experience that could otherwise be lost or forgotten.

Having described an example of identifying externally playing audio tracks during moments of interest, consider now a discussion of an example device in which can be used for various implementations.

EXAMPLE DEVICE

Figure 11:
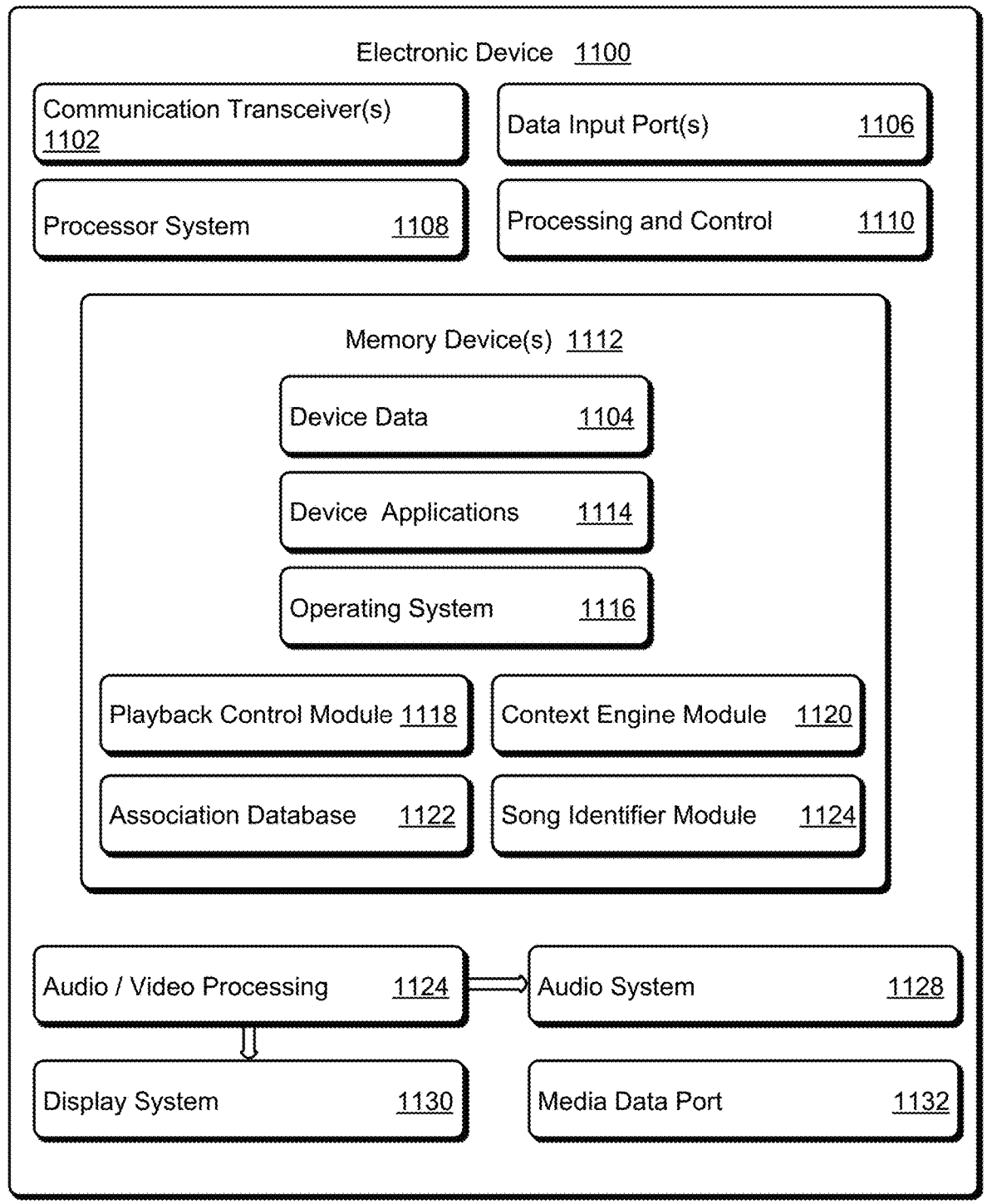
FIG. 11 is an illustration of an example device in accordance with one or more implementations.

FIG. 11 illustrates various components of an example electronic device 1100, such as computing device 102 of FIG. 1, which can be utilized to implement various aspects as further described herein. Electronic device 1100 can be, or include, many different types of devices capable of realizing automatic image association with an audio track in accordance with one or more implementations.

Electronic device 1100 includes communication transceivers 1102 that enable wired or wireless communication of device data 1104, such as received data and transmitted data. While referred to as a transceiver, it is to be appreciated that communication transceivers 1102 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 1100 may also include one or more data-input ports 1106 via which any type of data, media content, and inputs can be received, such as user-selectable inputs, messages, music, television content, recorded video content, and any other type of audio, video, or image data received from any content or data source. Data-input ports 1106 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 1100 of this example includes processor system 1108 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 1110. Although not shown, electronic device 1100 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 1100 also includes one or more memory devices 1112 that enable data storage, examples of which include random access memory (RAM), non-volatile memory (e.g., read-only memory (ROM), flash memory, EPROM, EEPROM, etc.), and a disk storage device. Memory devices 1112 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 1112 provide data storage mechanisms to store the device data 1104, other types of information or data, and various device applications 1114 (e.g., software applications). For example, operating system 1116 can be maintained as software instructions within memory devices 1112 and executed by processor system 1108.

In some aspects, memory devices 1112 includes playback control module 1118, context engine module 1120, association database 1122, and song identifier module 1124. While these modules are illustrated and described as residing within memory devices 1112, other implementations of these modules can alternately or additionally include software, firmware, hardware, or any combination thereof.

Playback control module 1118 provides control of audio playback, such as through a user interface with software controls. Various implementations of playback control module 118 display images during playback of an audio track.

Context engine module 1120 tracks and/or generates context information associated with an audio track. This can include frequency of playback, location of playback, image viewing during playback, and so forth. Alternately or additionally, context engine module 1120 analyzes the context information as a way to identify audio tracks of interest to a user, examples of which are provided herein.

Association database 1122 stores information that associates an audio track to one or more images. Various implementations store the information in a data structure, such as a data structure included in a same digital file as the audio track and/or image. Alternately or additionally, the information can be store separately from the audio track and/or image. The format in which association database 1122 adheres to a set of rules such that data stored in association database can be accessed by other entities, such as playback control module 1118 and/or context engine module 1120.

Song identifier module 1124 identifies an audio track from audio samples, such as audio samples captured by an ADC. Accordingly, song identifier module 1124 can employ various audio track recognition algorithms, such as algorithms that access an external database to compare various characteristics of the audio samples to the database as a way to identify an audio track. This can include converting the audio samples into the frequency domain, and matching the frequency domain characteristics.

Electronic device 1100 also includes audio and video processing system 1126 that processes audio data and passes through the audio and video data to audio system 1128. Audio system 1128 and display system 1130 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as media-data port 1132. In some implementations, audio system 1128 and display system 1130 are external components to electronic device 1100. Alternatively, or additionally, audio system 1128 and/or display system 1130 can be an integrated component of the example electronic device 1100, such as part of an integrated speaker and/or an integrated display and touch interface.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A mobile computing device comprising:
   one or more processors; and
   one or more computer-readable storage memories comprising processor-executable instructions that, responsive to execution by the one or more processors, cause the mobile computing device to perform operations comprising:
   identifying an audio track playing external to the mobile computing device while the mobile computing device captures an image;
   storing audio track information of the identified audio track with the captured image; and
   displaying a user interface element during a subsequent display of the captured image, the user interface element including a notification indicating that the identified audio track was playing while the image was captured.

2. The mobile computing device of claim 1, the user interface element further including a control that enables purchase of the identified audio track, the notification and the control displayed together in the user interface element.

3. The mobile computing device of claim 2, wherein said operations further comprise:
   receiving activation of the control; and
   downloading the identified audio track in response to receiving the activation of the control.

4. The mobile computing device of claim 1, wherein said identifying the audio track playing external to the mobile computing device further comprises:
   displaying a prompt to activate a song identification process;
   receiving confirmation to activate the song identification process;
   gathering audio external to the mobile computing device; and
   processing the audio to recognize the audio track.

5. A computer-implemented method comprising:
   identifying an audio track playing external to a mobile computing device while the mobile computing device captures an image;
   storing audio track information of the identified audio track with the captured image; and
   displaying a user interface element during a subsequent display of the captured image, the user interface element including a notification indicating that the identified audio track was playing while the image was captured.

6. The method of claim 5, the user interface element further including a control that enables purchase of the identified audio track, the notification and the control displayed together in the user interface element.

7. The method of claim 6, the method further comprising:
   receiving activation of the control; and
   downloading the identified audio track in response to receiving the activation of the control.

8. The method of claim 5, wherein said identifying the audio track playing external to the mobile computing device further comprises:
   displaying a prompt to activate a song identification process;
   receiving confirmation to activate the song identification process;
   gathering audio external to the mobile computing device; and
   processing the audio to recognize the audio track.

9. A system comprising:
   a context engine module configured to identify an audio track playing external to a mobile computing device while the mobile computing device captures an image;
   an association database configured to store audio track information of the identified audio track with the captured image; and
   a playback control module configured to display a user interface element during a subsequent display of the captured image, the user interface element including a notification that indicates the identified audio track was playing while the image was captured.

10. The system of claim 9, the user interface element further including a control that enables purchase of the identified audio track, the notification and the control displayed together in the user interface element.

11. The system of claim 10, wherein the playback control module is further configured to:
  receive activation of the control; and
  download the identified audio track in response to receiving the activation of the control.

12. The system of claim 9, wherein to identify the audio track playing external to the mobile computing device is to:
  display a prompt to activate a song identification process;
  receive confirmation to activate the song identification process;
  gather audio external to the mobile computing device; and
  process the audio to recognize the audio track.

13. The mobile computing device of claim 2, wherein said displaying the user interface element further comprises overlaying the user interface element over the captured image, the captured image remaining visible when the user interface element is displayed.

14. The method of claim 6, wherein said displaying the user interface element further comprises overlaying the user interface element over the captured image, the captured image remaining visible when the user interface element is displayed.

15. The system of claim 10, wherein to display the user interface element is to overlay the user interface element over the captured image, the captured image remaining visible when the user interface element is displayed.

\* \* \* \* \*